(12) United States Patent
Barrett et al.

(10) Patent No.: US 9,813,467 B1
(45) Date of Patent: Nov. 7, 2017

(54) REAL-TIME ALIGNMENT AND PROCESSING OF INCOMPLETE STREAM OF DATA

(71) Applicants: Ryan Barrett, San Francisco, CA (US); Taylor Sittler, San Francisco, CA (US); Krishna Pant, San Jose, CA (US); Zhenghua Li, San Jose, CA (US); Katsuya Noguchi, San Francisco, CA (US); Nishant Bhat, San Francisco, CA (US)

(72) Inventors: Ryan Barrett, San Francisco, CA (US); Taylor Sittler, San Francisco, CA (US); Krishna Pant, San Jose, CA (US); Zhenghua Li, San Jose, CA (US); Katsuya Noguchi, San Francisco, CA (US); Nishant Bhat, San Francisco, CA (US)

(73) Assignee: COLOR GENOMICS, INC., Burlingame, CA (US)

( * ) Notice: Subject to any disclaimer, the term of this patent is extended or adjusted under 35 U.S.C. 154(b) by 0 days.

(21) Appl. No.: 15/452,241

(22) Filed: Mar. 7, 2017

Related U.S. Application Data

(60) Provisional application No. 62/304,474, filed on Mar. 7, 2016.

(51) Int. Cl.
*H04L 29/08* (2006.01)
*G06F 15/16* (2006.01)
*H04L 29/06* (2006.01)

(52) U.S. Cl.
CPC .......... *H04L 65/4069* (2013.01); *H04L 65/80* (2013.01)

(58) Field of Classification Search
CPC ............ H04L 65/4069; H04L 67/2852; H04N 21/26283
See application file for complete search history.

(56) References Cited

U.S. PATENT DOCUMENTS

| 7,877,438 B2 * | 1/2011 | Schrempp | H04H 20/14 709/201 |
| 8,904,457 B2 * | 12/2014 | Sood | H04N 21/26283 709/231 |
| 2016/0219089 A1 * | 7/2016 | Murthy | H04L 65/4076 |
| 2017/0177546 A1 * | 6/2017 | Heinz | G06F 17/18 |

OTHER PUBLICATIONS

"Sparse Indexing: Large Scale, Inline Deduplication Using Sampling and Locality"—Lillibridge et al, HP Labs, Feb. 2010 http://citeseerx.ist.psu.edu/viewdoc/download;jsessionid=F350B98634BFE99DAD9B7F8D52F09ED7?doi=10.1.1.363.9616&rep=rep1&type=pdf.*

* cited by examiner

*Primary Examiner* — Randy Scott
(74) *Attorney, Agent, or Firm* — Kilpatrick Townsend & Stockton LLP

(57) ABSTRACT

Techniques are disclosed for processing and aligning incomplete data. A stream of data is received from a data source including a plurality of reads. While receiving the stream of data and prior to having received all of the plurality of reads, a set of reads is extracted from the plurality of reads. Each of the set of reads is aligned to a corresponding portion of a reference data set. For each particular position of a plurality of particular positions of the reference data set, a subset of reads of the aligned set of reads is identified. A value of a client data set is generated based on the subset of reads. A variable is generated based on the client data set. Data is routed when a condition, based on the variable, is satisfied.

20 Claims, 12 Drawing Sheets

REAL-TIME ALIGNMENT AND PROCESSING OF INCOMPLETE STREAM OF DATA

CROSS-REFERENCES TO RELATED APPLICATIONS

The application claims the benefit of and the priority to U.S. Provisional Application No. 62/304,474, filed on Mar. 7, 2016, which is hereby incorporated by reference in its entirety for all purposes.

BACKGROUND OF THE INVENTION

Processing data prior to receiving the data in its entirety presents various challenges for assessment systems, particularly when the data is analyzed to trigger specific actions based on the content of the data in its entirety. In most instances, assessment systems must wait until the data has been completely received prior to performing any analysis on the data. In many cases, portions of the data may arrive over large time scales, on the order of days and weeks. Therefore, new systems, methods, and products for accurately and efficiently processing incomplete data are needed.

BRIEF SUMMARY OF THE INVENTION

Techniques are disclosed for processing and aligning incomplete data. Some embodiments of the present disclosure include a method including receiving, at a system, a stream of data from a data source. In some embodiments, the stream of data includes a plurality of reads. In some embodiments, each of the plurality of reads correspond to a client. In some embodiments, the method includes, while receiving the stream of data and prior to having received all of the plurality of reads, extracting each of a set of reads from the stream of data. The method may also include aligning each of the set of reads to a corresponding portion of a reference data set.

The method may further include, for each particular position of a plurality of particular positions of the reference data set, identifying a subset of reads of the aligned set of reads. In some embodiments, each read in the subset of reads includes an identifier that is aligned to the particular position of the reference data set. In some embodiments, the method includes generating a value of a client data set based on the subset of reads, the value corresponding to the particular position. In some embodiments, the method also includes generating at least one variable based on the values of the client data set. In some embodiments, the method further includes determining, based on the at least one variable, that at least one condition is satisfied. In some embodiments, the method includes, in response to determining that the at least one condition is satisfied, routing data that corresponds to the client data set.

In some embodiments, generating the value of the client data set based on the subset of reads further includes identifying, for each read in the subset of reads, a read value for the particular position and determining the value of the client data set based on the identified read values. In some embodiments, the read value for each of at least some of the subset of reads is the same as the value for the client data set. In some embodiments, generating the value of the client data set includes generating a value of a client coverage data set corresponding to a proportion and/or quantity of the subset of reads that include an identifier that is aligned to the particular position of the reference data set or generating a value of client consistency data set corresponding to a similarity amongst the subset of reads that include the element that is aligned to the particular position of the reference data set.

In some embodiments, generating the value of the client data set includes generating a value of a client coverage data set corresponding to a proportion and/or quantity of the subset of reads that include an identifier that is aligned to the particular position of the reference data set and routing data that corresponds to the client data set further includes availing at least part of the client data set to one or more processors for sparse indicator detection. In some embodiments, the method includes, in response to determining that the at least one condition is satisfied, comparing values of the at least part of the client data set to corresponding values of the reference data set and identifying one or more sparse indicators based on the comparison. In some embodiments, the method also includes, for each sparse indicator of the one or more sparse indicators, assigning the sparse indicator to a data bucket of a plurality of data buckets and, for each data bucket of one or more of the plurality of data buckets, assessing a number of sparse indicators assigned to the data bucket. In some embodiments, the method further includes generating a client result based on the assessment and transmitting or presenting the client result prior to the having received all of the plurality of reads.

In some embodiments, the at least one variable includes a quality metric that corresponds to a quality of the set of reads. In some embodiments, determining that the at least one condition is satisfied includes determining that the quality metric is below a predefined threshold. In some embodiments, routing data that corresponds to the client data set includes transmitting a data-quality communication to the data source that includes an identifier associated with the client and is reflective of the quality metric. In some embodiments, receiving the stream of data includes receiving a series of discrete communications from the data source. In some embodiments, each communication of the series of discrete communications includes at least one read of the plurality of reads.

Some embodiments of the present disclosure include a system including one or more data processors. In some embodiments, the system includes a non-transitory computer readable storage medium containing instructions which when executed on the one or more data processors, cause the one or more data processors to perform part of all of one or more methods and/or part or all of one or more processes disclosed herein. Some embodiments of the present disclosure include a computer-program product tangibly embodied in a non-transitory machine-readable storage medium including instructions configured to cause one or more data processors to perform part of all of one or more methods and/or part or all of one or more processes disclosed herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Figure 1:
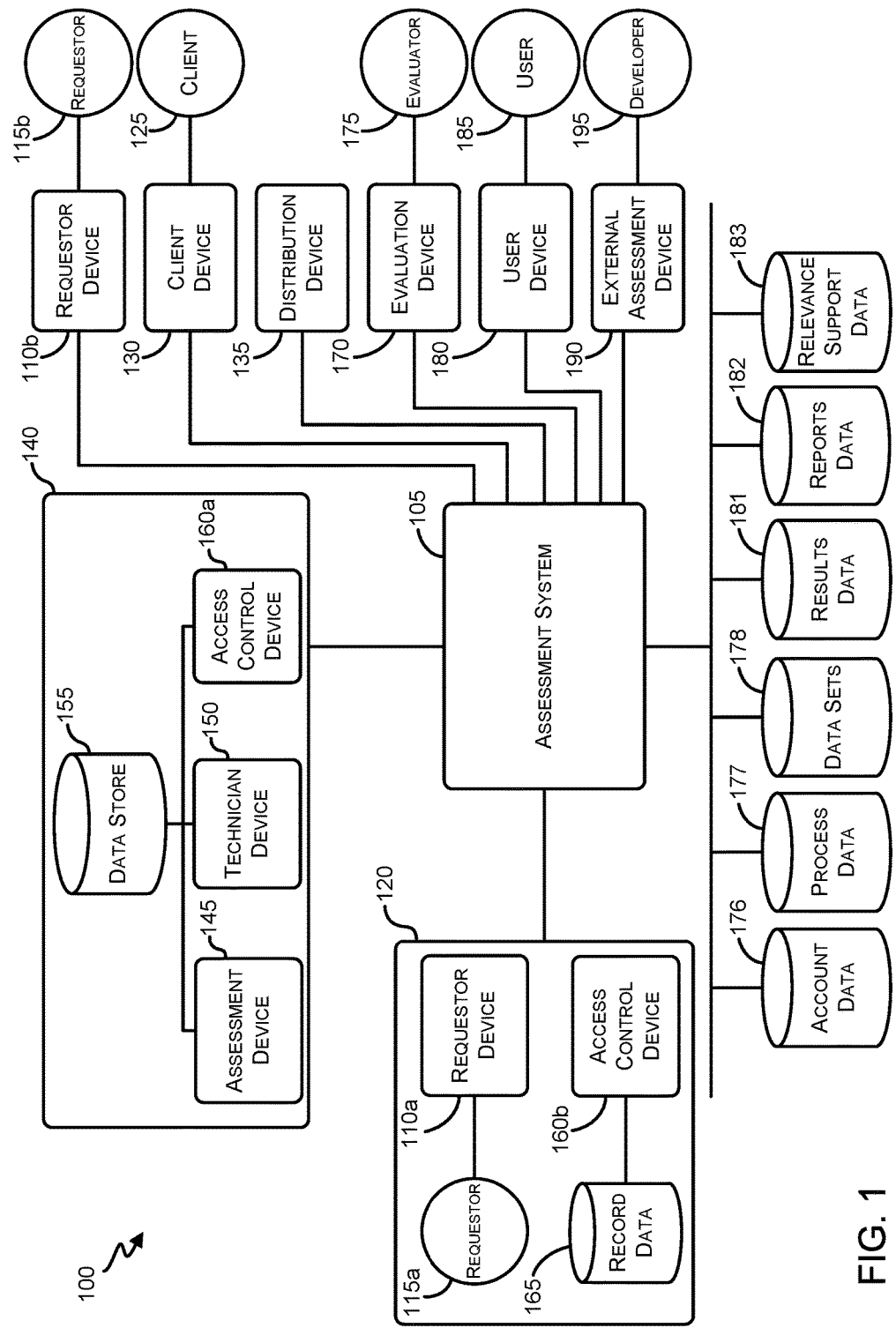
FIG. 1 shows a representation of a data processing network, in accordance with some embodiments of the invention.
Figure 2:
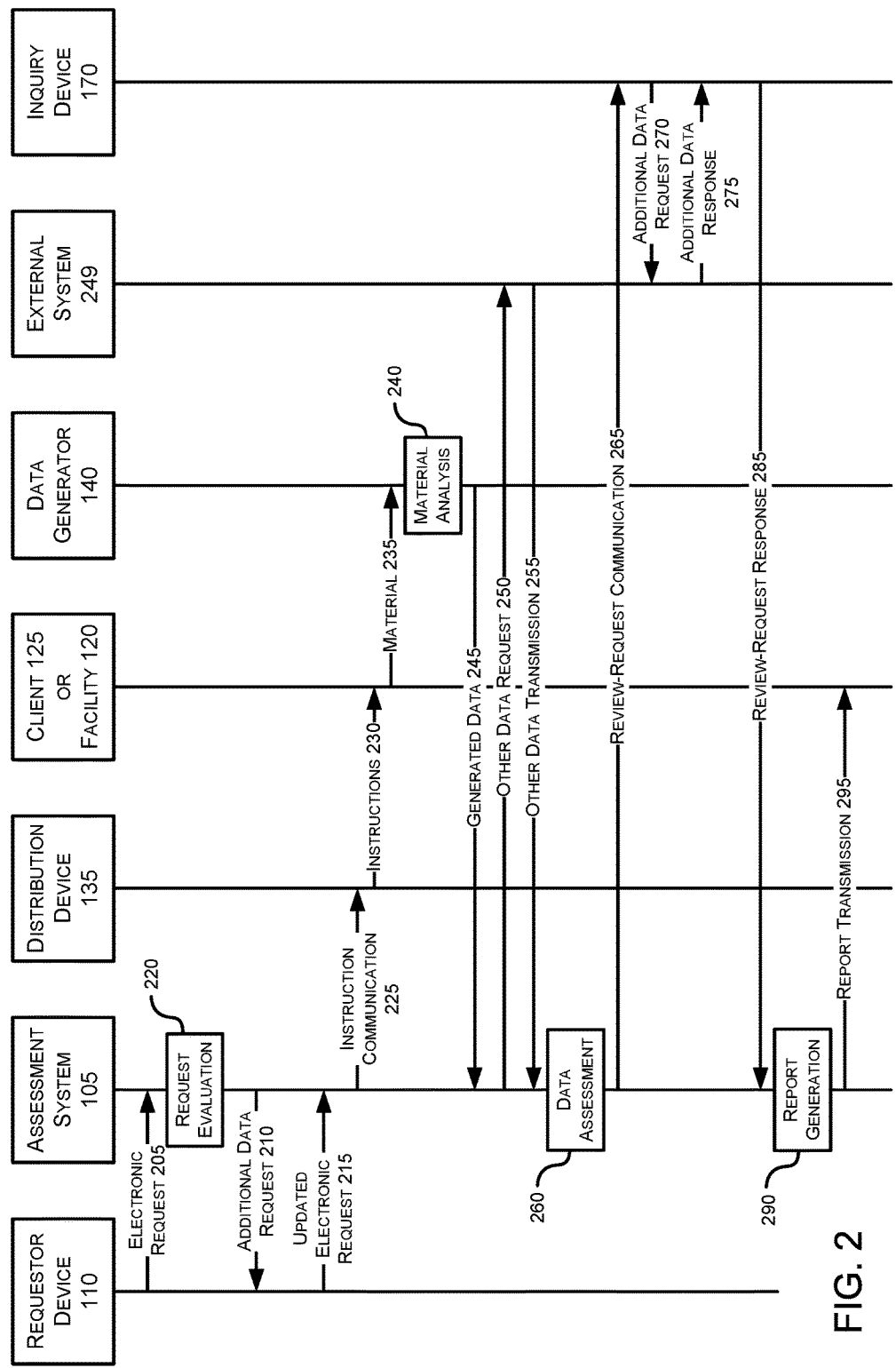
FIG. 2 shows a communication exchange between systems and devices of an data processing network, in accordance with some embodiments.

FIG. 1 shows a representation of an assessment network 100. In addition, FIG. 2 illustrates interactions between various systems or components of assessment network 100 to illustrate the flows of data and materials, for example. An assessment system 105 may, for example, receive an electronic request 205 from a requestor device 110. Assessment system 105 may include one or more electronic devices (e.g., storage devices, servers, and/or computers) and may, but need, reside partly or entirely at a remote server. Requestor device 110 may be configured and located to receive input from a requestor 115. In one instance, requestor device 110a is located in an external facility 120. In one instance, requestor device 110b includes an internally linked requestor device 110b, such as one that itself receives invitations, such as from assessment system 105, to generate electronic requests.

Request 205 may include instructions to conduct a dataset analysis, for example. Optionally, request 205 may be encrypted prior to transmission; such an electronic request may be decrypted upon receipt. Request 205 may identify, or otherwise indicate, one or more states to be evaluated during the analysis and/or during an assessment. Request 205 may identify a client and/or include additional data pertaining to the client, such as client-identifying data.

The client may be equated to, by assessment system 105, a client device 130. In some instances, a client device 130, associated with client 125, initially transmits a preliminary electronic request for the analysis and/or assessment to assessment system 105. For example, such a preliminary electronic request may be initiated via interaction with a website associated with assessment system 105. The same or a subsequent preliminary request may identify a particular requestor (e.g., by name, office location, phone number, and/or email address) and/or may request that a requestor 115b associated with an internally linked requestor device 110b submit such a request.

When a particular entity is identified in a preliminary electronic request, assessment system 105 may identify a destination address (e.g., IP address or email address) associated with the entity and transmit a communication identifying information associated with the preliminary request (e.g., the client, a type of analysis, and so on). The communication may include a partial instruction and/or an input field that would confirm that the request of the client 125 is to be generated and transmitted back to assessment system 105. Such a communication may facilitate receipt of the electronic request 205 from requestor device 110b.

When it is requested that a requestor 115b associated with an internally linked requestor device 110b submit such a request, assessment system 105 may transmit a similar communication to a requestor device 110b that may have been selected from among multiple internally linked requestor devices. The selection may be based on a load balancing technique, availability hours, expertise, locations of the multiple requestor devices, a pseudo-random selection technique, and/or an entity affiliation.

Once request 205 has been received from a requestor device 110 (e.g., in response to a preliminary request from a client device 130), assessment system 105 may evaluate, such as at block 220, the request 205 to ensure that all required data has been provided and that all required data pertaining to client 125 has been identified (e.g., via the request, a preliminary request and/or stored data). If assessment system 105 determines that all required information has not been identified, a request 210 for such information may be transmitted to requestor device 110 and/or client device 130. The request 205 may be updated with this information and an updated electronic request 215 may be transmitted to assessment system 105. In various instances, an object provided to a user depends on an analysis requested, whether, and what kind of, new data-generation processing of a material is required for the analysis, a number of data-set units being assessed (e.g., and whether they have been previously assessed), a number and/or type of analyses being requested, a number and/or type of analyses previously requested, a number and/or type of analyses predicted to be requested subsequently, a state for which a progression prediction is being requested, whether a user is granting other entities' access to the client's data or results, whether a user is authorizing additional analyses to be performed on the client's data, and/or whether a user is granting permission to send offers to request user access to results or reports other than those initially being requested.

When all required information has been provided, assessment system 105 may send an instruction communication 225 to a distribution device 135. Optionally, communication 225 may be encrypted prior to transmission; such an encrypted communication may be decrypted upon receipt. Optionally, communication 225 may be transmitted using communications system 308 and/or over one or more network links, such as including transmission, at least in part, over a public communications network, such as the Internet. Communication 225 may include, for example, a name and address of client 125 and, in some instances, an indication as to what is to be provided to client 125 for collection of a material for subsequent analysis. For example, a request 205 may indicate a type of analysis that is to be performed on a material (e.g., an analysis pertaining to a likelihood of getting one or more particular types of states) and/or a type of material (e.g., type of sample) that is to be analyzed. Communication 225 may identify the type of analysis, type of material, and/or kit associated with collection of the material. The communication 225 may thus facilitate and/or trigger a physical distribution of instructions 230, which may include a kit or other sample collection materials, to a client address. The instructions 230 may include, for example, instructions as to how to collect a material, a container for storing the material and/or information pertaining to an instruction or type of analysis to be conducted. Alternatively, the instructions 230 may be provided to a facility 120, such as may be associated with a requestor 115*a*, who may aid client 125 in obtaining the material.

A material 235 from client 125 may then be directed to and received at a data generator 140 for analysis 240. Data generator 140 may be, for example, part of a facility. Data generator 140 may include one or more assessment devices 145 configured to generate data reads, data elements, or data sets for various data-set units using the material 235 as part of analysis 240. For example, an assessment device 145 may include a data-characterizer device (e.g., sequencer and/or polymerase chain reaction machine). Data generator 140 may further include one or more devices 150, such as a desktop or laptop computer. Generated data 245 generated by or at one or more devices (e.g., assessment device 145 or technician device 150) may be stored at a data store 155, which may be remote from all data generator devices or part of a data generator device. Data 245 may, for example, include identifying client information (e.g., a name and address), facility information (e.g., location and name), device specifications (e.g., manufacturer and model of assessment device) and data. In some embodiments, a facility, such as facility 120 or facility 140, may correspond to a lab.

In some instances, data is optionally collected or requested from one or more external systems 249. Thus, assessment system 105 may transmit one or more other data requests 250 and one or more other data transmissions 255 may provide the other data. For example, one or more data sets and/or one or more processed versions thereof (e.g., identifying one or more sparse indicators) corresponding to an existing or new client may be received from an external system 249, As another example, assessment system 105 may transmit a client data set to an external system 249, and external system 249 may then return a result of an assessment of the client data set. As yet another example, other data may include a data set (or results based on such data) corresponding to another individual (e.g., an entity related to a client and/or an entity sharing a characteristic with a client). The other individual may be, for example, identified based on input from the client and/or automatically identified (e.g., based on a query of a data store to identify clients associated with inputs or results indicating a shared characteristic or relationship). In some instances, a state assessment variable may be generated based on data from multiple other people, and the data for each other person may be weighted based on (for example) how closely related the person is with a client and/or how many or which characteristics the person shares with a client.

An access control device 160*a* may control which devices and/or entities may gain access to data 245, which may apply to devices and/or entities internal to data generator 140 and/or to devices and/or entities external to data generator 140. Access control device 160*a* may implement one or more rules, such as restricting access to client data to one or more particular devices (e.g., associated with assessment system 105). Such access may further or alternatively be controlled via logins, passwords, device identifier verification, etc.

In various instances, access control device 160*a* controls access via control of pushed transmissions and/or via control of processing pull requests. For example, a rule may indicate that data 245 pertaining to a material, such as a sample, is to automatically be transmitted to a particular assessment system 105 (and/or device associated therewith) upon completion of a facility-based assessment or detection of particular data (e.g., data matching a request). Access control device 160*a* may then monitor for such a criterion to be met and may then generate and transmit appropriate data.

Data 245 may include a plurality of data reads, data elements, or sets (e.g., each data read in the plurality of data reads corresponding to a same client, or at least some of the plurality of data reads corresponding to different clients). In various instances, data 245 may be transmitted to assessment system 105 in a batch-mode, in a streaming mode, in real-time as data is produced, and/or upon request. Data 245 may also be stored at a data store local or remote to data generator 140. A given transmission or stream may include data that corresponds to a single, or in other instances to multiple, client, sample, and/or data reads. In some instances, access control device 160*a* evaluates one or more transmission conditions, which may indicate, for example, whether and/or what data is to be transmitted given a quantity of data collected (e.g., generally, since a past transmission and/or for a given client or sample) and/or given a time since a previous transmission. In one instance, as data reads are generated by an assessment device, a data set is generated so as to include each new data read and one or more identifiers (e.g., of a client, sample, time and/or facility device). The data may then be transmitted via a discrete communication (e.g., via FTP, over a webpage upload, email message, or SMS message) to assessment system 105. In one instance, the data may then be appended to a stream that is being fed to assessment system 105.

It will be appreciated that assessment network 100 may, in some instances, include multiple data generators 140, each of which may include an assessment device 145, technician device and/or access control device 160a. Further, a given data generator 140 may, in some instances, include multiple assessment devices 145, multiple technician devices 150 and/or multiple access control devices 160a. Thus, data 245 received at assessment system 105 may include data collected by and/or derived from data collected by different assessment devices, which may result in the data having different biases, units, and/or representation. Similarly, personnel operating different technician devices 150 may utilize different protocols and/or data interpretation techniques, which may again result in receipt of data at assessment system 105 that has different biases, units, variables, and so on. Further, even data originating from a same device may, in time, exhibit different biases, units, and so on, which may be a result of a manipulation of a control of the device and/or equipment wear.

Thus, in some instances, assessment system 105 performs a comparison across data 245 received from a data generator device (e.g., an access control device 160a or directly from an assessment device 145 or technician device 150) associated with data generator 140. The comparison may be across, for example, data collected at different facilities, data based on measurements collected at different devices, and/or data collected at different times. It will be appreciated that the comparison may include a direct comparison of collected data or comparing preprocessed versions of the collected data. For example, received data may first be preprocessed via a transformation and/or dimensionality-reduction technique, such as principal component analysis, independent component analysis, or canonical correspondence analysis.

The comparison may include, for example, performing a clustering technique so as to detect whether data corresponding to a given facility, device, or time period predominately resides in a different cluster than data corresponding to one or more other facilities, devices, or time periods. The clustering technique may include, for example, a connectivity based clustering technique, a centroid-based clustering technique (e.g., such as one using k-means clustering), a distribution-based clustering technique, or a density-based clustering technique.

The comparison may additionally or alternatively include a statistical technique, such as one that employs a statistical test to determine whether two or more data sets (e.g., corresponding to different facilities, devices, or time periods) are statistically different. For example, a Chi-square, t-test or ANOVA may be used.

The comparison may additionally or alternatively include a time-series analysis. For example, a regression technique may be used to determine whether output from a given device is gradually changing in time.

When it is determined that particular data corresponding to a given facility, device, or time period is different than data corresponding to one or more other facilities, devices, or time periods (e.g., is assigned to a different cluster than other data or is associated with a p-value below a threshold), a normalization and/or conversion factor may further be identified. For example, a normalization and/or conversion factor may be identified based on centroids of data clusters and/or inter-cluster distances. As another example, a linear or non-linear function may be derived to relate data from a given facility, device, or time period to other data.

In some instances, a determination that particular data corresponding to a given facility, device, or time period is different than data corresponding to one or more other facilities, devices, or time periods may indicate that data from the given facility, device, or time period is not to be used. In such instances, an instruction communication may be sent to a facility to reprocess a material, such as a sample.

In addition to receiving data 245, assessment system 105 may further collect one or more other data that may be used to assess, for example, a likelihood for transitioning into a particular state. For example, one type of other data may include inputs provided at a client device 130, such as inputs that indicate past-state data and/or current-state data, familial-state data and statuses, age, occupation, activity patterns, association with environments having particular characteristics, and so on. The other data may be received by way of one or more other data transmissions 255 from external system 249. Optionally, other data transmission 255 may be encrypted prior to transmission; such an encrypted transmission may be decrypted upon receipt. Optionally, other data transmission 255 may be transmitted over one or more network links, such as including transmission, at least in part, over a public communications network, such as the Internet. Optionally, other data transmission 255 may be transmitted over at least a portion of communications system 308.

Another type of other data may include data automatically detected at a client device 130. For example, a wearable client device may track activity patterns so as to estimate calories burned per day, or the wearable client device may estimate a pulse distribution, client temperature, sleep patterns and/or indoor/outdoor time. This data obtained directly by client device 130 may be directly transmitted (e.g., after request 250 and/or authorization handshake) to assessment system 105 and/or via another client device (e.g., via accessing health-data on a phone or computer device). Optionally, other data obtained directly by client device 130 may be transmitted over one or more network links, such as including transmission, at least in part, over a public communications network, such as the Internet. Optionally, other data obtained directly by client device 130 may be transmitted over at least a portion of a communication system. Optionally, other data obtained directly by client device 130 may be part of other data transmission 255.

Yet another type of other data may include record data, which may be stored, for example, at a record data store 165 at and/or associated with an external facility, such as one having provided an electronic request to perform an analysis or assessment pertaining to a client and/or one as identified via input at a client device 130. To illustrate, the other data may identify one or more client reported experiences and/or evaluation results for a client or may include a result of one or more tests.

In some instances, other data may include data pertaining to a different client. For example, it may be determined or estimated that a given client is related to another client. Such determination or estimation may be based on inputs detected at a client device identifying one or more family members (e.g., by name), and a data store may be queried to determine whether any clients match any of the family member identifications. Such relationship determination or estimation may alternatively or additionally be based on a data set analysis, such that a raw or processed data set from the given client is compared to a raw or processed data set from some or all other clients to identify, for example, whether any other clients share a threshold portion of a data set with the client. Upon detecting an above-threshold match, a percentage of value matching may be used to estimate a type of relationship between the clients. Upon identifying a related client, other data corresponding to the related client may be identified. For example, the other data may include a past or current state of the related client. The other data may be identified (for example) based on an input provided by the client or the related client or record data associated with the related client.

Thus, assessment system 105 may have access to, for a given client, one or more data sets, data set availability modification data, client-reported data, record data, test data, activity data, and/or other types of data. These data may be detected, assessed, or otherwise evaluated, at block 260, such as in one or more assessment processes. Data sets may be evaluated to detect and assess sparse indicators, for example, as described below in further detail. The detection and/or assessment at block 260 may be performed, for example, partly or fully at assessment system 105. In some instances, the detection and/or assessment at block 260 is performed in a partly or fully automated manner. In some instances, the detection and/or assessment at block 260 involves processing of inputs provided by a reviewer or evaluator.

Generation of a report, at block 290, may be performed using the results of data assessment of block 260. A report transmission 295 may include the report and be transmitted to client 125 or facility 120, such as by way of client device 130 or requestor device 110a.

Figure 3:
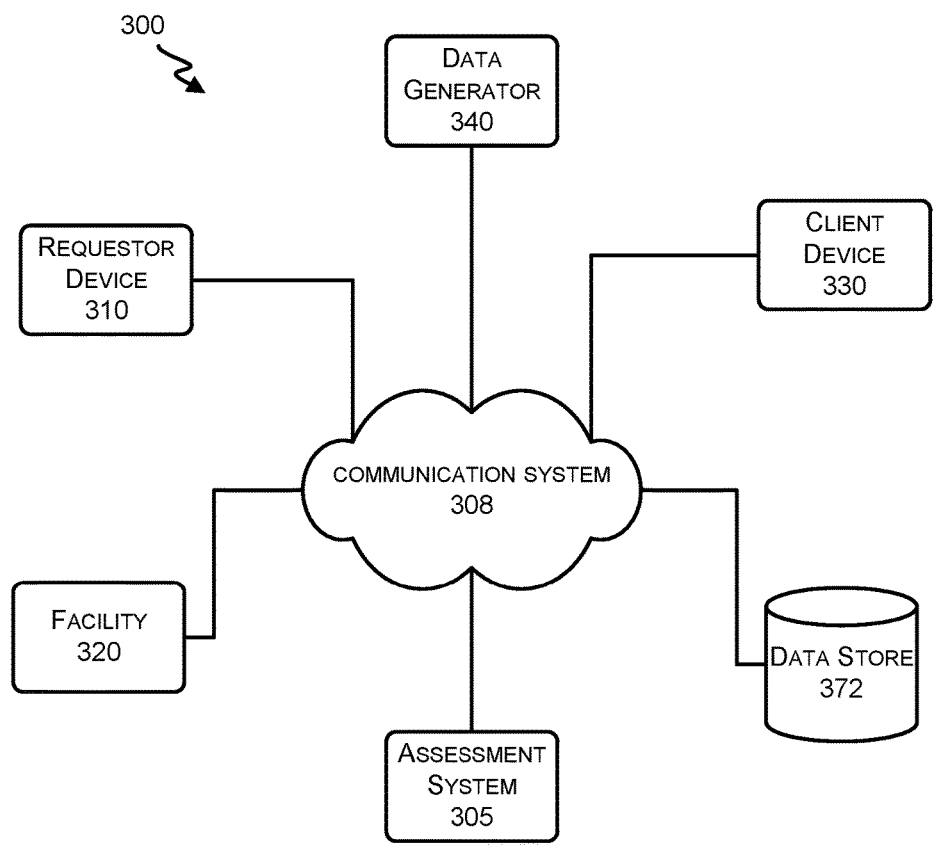
FIG. 3 shows a representation of an example communication network, in accordance with some embodiments.

Referring next to FIG. 3, an assessment network 300 is shown in one embodiment. Assessment network 300 may, but need not, correspond to assessment network 100 shown in FIG. 1. Through the interaction of multiple devices and entities, an assessment system 305 may receive data sets corresponding to individual clients. As illustrated, assessment system 305 may connect, via communication system 308, to each of one or more other systems or devices. Assessment network 300 may also include additional systems or devices, as illustrated in FIG. 3. For example, assessment network 300 may include requestor device 310, facility 320, client device 330, data generator 340, and data store 372, in addition to other systems or devices not explicitly depicted in FIG. 3.

Data may be exchanged between various systems or devices of assessment network, such as by way of communication system 308. Communication system 308 may, for example, include one or more data communication systems or networks, such as a wired or wireless data connection that makes use of or is compliant with one or more Institute of Electrical and Electronics Engineers (IEEE) networking standards, such as 802.3 (Ethernet), 802.11 (Wi-Fi), or 802.16 (WiMAX), or other data communications standards such as IEEE 1394 (FireWire), Bluetooth, Universal Serial Bus (USB), Serial ATA (SATA), Parallel ATA (PATA), Thunderbolt, Fibre Channel, Small Computer System Interface (SCSI), GSM, LTE, etc. Communication system 308 may include one or more TCP/IP compliant interconnections, such as may be present on a private or public communications network, such as the Internet. Communication system 308 may further include servers, systems, and storage devices in the cloud. Communication system 308 may represent or include one or more intermediate systems or data connections between various other components of assessment network 300. Additionally, communication system 308 may represent a direct connection between various other components of assessment network 300, such as a direct connection between assessment system 305 and data store 372, which may optionally allow for communication with data store 372 by other components of assessment network 300 only by way of assessment system 305, for example. It will be appreciated that data store 372 may include one or more data stores, which may optionally be linked or otherwise configured or organized to allow for efficient retrieval and storage of data by reference to different entries in particular data stores or data tables. For example, data store 372 may comprise a relational database or data store, in some embodiments.

One or more of the devices or systems of assessment network 300 may be present at a single location or each may be present at various different locations and be in data communication with one another via communication system 308, depending on the specific configuration. For example, facility 320 and data generator 340 may be at a same location. Requestor device 310 may further be present at facility 320, such as if possessed by a requestor personnel, for example. Similarly, client device 330 may also be present at data generator 340 or facility 320, such as if possessed by a client, for example. In some embodiments, one or more devices or systems of assessment network 300 may be mobile devices, such as a smartphone, tablet computer, laptop, or other compact device, which may facilitate transport between locations or with a user or client. Use of mobile devices may, for example, be advantageous for allowing input to be entered in real-time and/or on request from any location in order to facilitate expedient processing and/or analysis of data or generation of state assessments.

In one instance, assessment system 305 receives a request communication (e.g., via communication system 308) from a requestor device 310 that identifies a client. Client identifying authentication and/or other information can be received from a client device (e.g., which, in some instances, is also requestor device 310). Assessment system 305 may then prime data generator 340 to detect a material associated with the client and generate a set of reads based thereupon.

Assessment system 305 may process the reads by, for example, extracting the reads, aligning individual reads to a reference data set (e.g., reference genome), generating a client data set, and performing further processing on the reads and/or client data set. For example, a reference data set may include an identifier data set (e.g., a sequence) that identifies a base at each of a set of positions, such as each position along one or more data-set units (e.g., genes). In some instances, alignment is performed before all reads associated with a client are received. For example a data stream (e.g., received as a continuous data stream or a series of communications, each of which includes one or more reads) may be received from a data source and one or more reads may be extracted from the data stream in real-time as the data stream is received. The extraction can further include identifying (e.g., based on metadata, a data field or other information) to which client each read (or group of reads) is associated. The extraction may be performed (for example) using a schema, detecting one or more delimiters, and/or recognizing character types.

Upon extracting each read, an alignment process may be performed in which each individual read is aligned with a corresponding portion of a reference data set. In some instances, the alignment process is performed by correlating each individual read with the reference data set and identifying a maximum or above-threshold value of a resulting correlation function. The maximum value or above-threshold value of the correlation function may correspond to a "best fit" or "good fit" location for aligning a particular read with the reference data set. In some instances, a score can be generated for each of one or more portions of the reference data set by comparing identifiers of a read to corresponding identifiers of the portion, and an alignment can be identified based on the score. (For a score may depend on whether each identifier matches a correspond reference-data identifier, is complementary to a corresponding reference-data identifier or neither.) An alignment result may then identify a portion (or characteristic thereof, such as a start and/or stop position of the portion) based on the scores (e.g., to identify a portion with a highest score and/or to identify any portion with a score above a defined threshold). The alignment process may alternatively or additionally include determining the location along the reference data set in which each individual read shares the most elements and/or read values in common with the reference data set. The alignment process may optionally include a preliminary step of comparing each individual read to previously aligned reads to determine whether certain similarities between reads can reduce the subsequent time needed for alignment.

Prior to assessment system 305 receiving all reads associated with a client, and/or during real-time extraction and alignment of the reads, assessment system 305 may further generate and/or update one or more client data sets in real time. In some instances, the term "real time" is used herein to refer to the processing of input data within milliseconds, or more or less than within milliseconds, from when it is received. For example, the processing of input data within 1 ms, 10 ms, 100 ms, 1 second, 1 minute, or 1 hour may each be considered "real time". In some instances, a client data set is generated by identifying a subset of the reads that include an element that is aligned to a particular position (i.e., reads that overlap), identifying a read value for each of the subset of reads at the particular position, and determining a value of the client data set at the particular position based on the identified read values (e.g., the client-data value being defined to be a value most represented in the identified read values). The process may then be repeated for different positions to generate a client data set with multiple values. Because different reads do not necessarily perfectly overlap, the subset of reads is position dependent and is re-identified at each position of overlap. In some instances, values of the client data set are determined only for particular positions of the reference data set such that the client data set only corresponds to a portion of the reference data set.

Each value of the client data set may be determined based on the identified read values of the subset of reads using one of several approaches. In one instance, an average or mode calculation is performed (e.g., value set equal to most common identified read value). In another approach, the identified read values are assigned different weights according to a confidence that a specific read was correctly aligned. For example, reads having greater length and/or having a higher correlation with the reference data set may be given greater weight. In one instance, the length and the correlation of the reads are only determined as a tie-breaking mechanisms when two or more different identified read values are equally common. The client data set may be generated and/or updated in real-time after each additional aligned read, at defined time points or intervals, or in response to detecting that an alignment condition is satisfied (e.g., determining that at least a threshold number or portion of reads associated with a client have been received or determining that at least a threshold time has elapsed since receipt of a first read associated with a client).

Assessment system 305 may detect one or more differences using a client identifier data set, the reference data set, and/or a client coverage data set that identifies, for each position of the client identifier data set, a number of aligned reads that overlap with each position. For example, a difference may be identified by detecting a difference, at a given position, between a value (e.g., identifier) of the client identifier data set and a corresponding value of the reference data set. As another example, a difference may be identified by detecting an abrupt change in the client coverage data set (e.g., such that values abruptly change approximately 2- or 3-fold). A sparse indicator (e.g., variant) may be defined for each difference to characterize the difference. For example, a sparse indicator may identify a type of difference observed (e.g., what identifier was present in an identifier data set as opposed to a reference data set or how the client coverage data set changed) and a position (e.g., with respect to the reference data set and/or along one or more data-set units) at which the difference was observed.

Each sparse indicator may be assigned to a bucket which may reflect a predicted impact of the detected difference. In some instances, a set of buckets are defined. Each of one, more or all of the buckets may correspond to a predicted likelihood that a client will progress to a given state. A state may include, for example, utilizing a full memory bank, a condition (e.g., medical condition or disease, such as cancer), reduced bandwidth, and/or a connection drop. Thus, buckets may reflect whether and/or a degree to which a difference causes the state (e.g., reflecting memory requirements, whether the difference is (e.g., and/or is likely to be) pathogenic or benign), consumes bandwidth, and/or impairs a connection's stability). For each client, a determination as to how many sparse indicators were assigned to one or more particular buckets may be used to generate a result that identifies a state-progression prediction. The result may be transmitted to requestor device 310 and/or client device 330.

Sparse indicator detection may be performed in real-time after each additional aligned read, after the client identifier data set is generated or updated, at defined time points or intervals, or in response to detecting that an alignment condition is satisfied. For example, in some instances sparse indicator detection is initiated only when all values of the client coverage data set exceed some threshold, an average of the values of the client coverage data set exceeds some threshold, or when some other alignment variable exceeds some threshold.

Reads, data sets, sparse indicators, bucket assignments and/or results may be stored (e.g., in association with corresponding client identifiers) in one or more data stores. In some instances, data may be subsequently retrieved for performing an updated assessment (e.g., using a new bucketing protocol or result-generation technique), performing a different type of assessment and/or transmitting data to another device.

Figure 4:
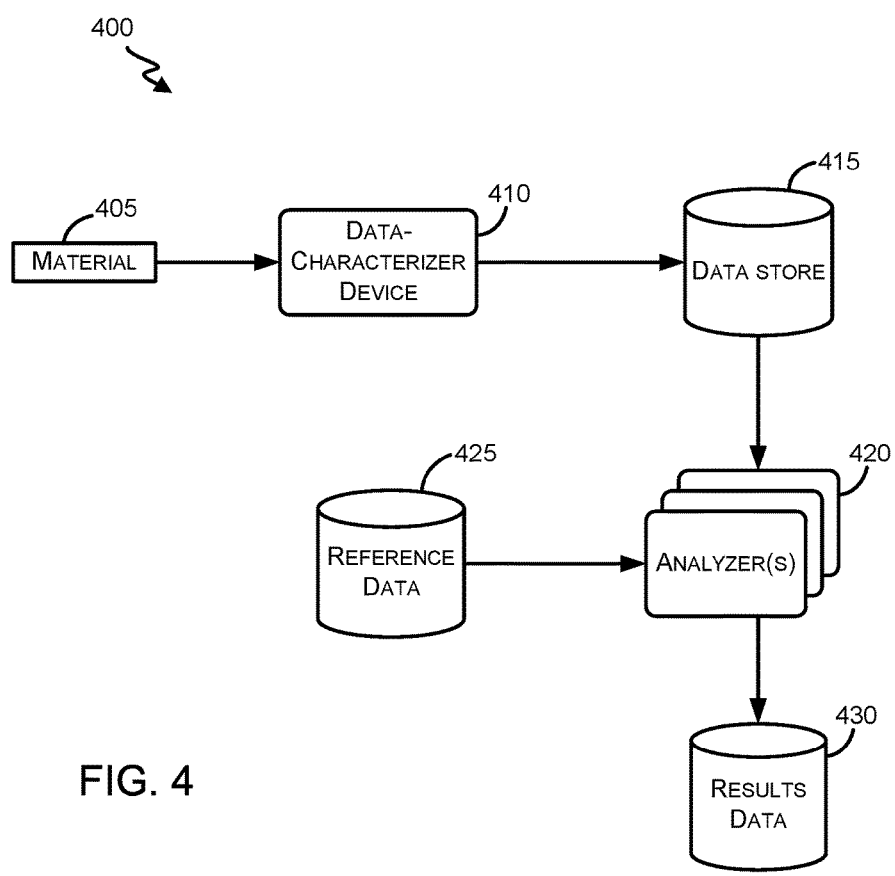
FIG. 4 shows a data flow, in accordance with some embodiments.

Turning next to FIG. 4, a data flow embodiment 400 is shown. Initially, a test material 405 is obtained from a client. As described above, the material 405 may be obtained directly by the client using a collection kit. A client may be able to obtain the material themselves, particularly if the material is easy to collect. Alternatively or additionally, material 405 is obtained at a facility. Obtaining material 405 at a facility may be useful if the material is more difficult to obtain, or if chain-of-custody is a concern.

Material 405 is assessed by a data-characterizer device 410, which may generate a plurality of data sets, including coverage data sets and identifier data sets. As the data sets are determined, they may be stored in data store 415 for subsequent analysis.

Data-characterizer device 410 and data store 415 may be located at a same location, such as a facility. Alternatively, data-characterizer device 410 and data store 415 may be remote from one another. In such a configuration, transmission of data sets from data-characterizer device 410 to data store 415 may occur using any of a variety of data communication standards and/or protocols. In one example, data sets are transmitted from data-characterizer device 410 over a wired and/or wireless network to reach data store 415. In another example, data sets are stored by data-characterizer device 410 directly to a storage medium, such as a flash drive or hard drive, which may be used to facilitate relaying data sets to remote data store 415. Optionally, data store 415 may comprise the storage medium. Data sets stored in data store 415 may be analyzed by data set analyzer 420. Data set analyzer 420 may be located at a same or different location from data-characterizer device 410 and/or data store 415.

Depending on the particular configuration, data sets generated by data-characterizer device 410 and/or stored in data store 415 may be analyzed individually, in real-time as the data sets are produced, or in batches, such as upon completion of a plurality of data sets. Data set analyzer 420 may utilize reference data stored in reference data store 425 in analysis of the data sets generated by data-characterizer device 410 and/or stored in data store 415.

A variety of analyses may be performed on the data sets by data set analyzers 420. For example, data set analyzer 420 may align each read in a data set to a portion of one or more reference sets. Data set analyzer 420 may also generate coverage data and/or identifier data using reads from the data set. Upon completion of the analysis, the information corresponding to the data sets (e.g., coverage data and/or identifier data) and/or alignment indications may be transmitted to and/or stored in one or more results data stores 430, which may correspond to a portion of data store 372.

It will be appreciated that data set analysis may be resource intensive, and thus a plurality of data set analyzers 420 may be used during the analysis process to distribute the resource burden, for example, and/or increase the rate at which data sets may be analyzed. For example, if a plurality of alignments are to be evaluated, such as by determining a potential alignment of an individual data set against multiple reference data sets, it may be desirable to distribute the tasks among multiple data set analyzers 420. Load balancing between a plurality of data set analyzers 420 may be performed to further enhance the use of resources, for example. Additionally, it may be desirable to compare the data sets stored in data store 415 against multiple reference data sets, such as from related family members or from people sharing one or more characteristics, as described above, and comparisons of the data sets with different reference data sets may be performed by different data set analyzers.

Additionally or alternatively, data sets may be analyzed by one or more data set analyzers 420 to identify one or more sparse indicators. Additionally or alternatively, data sets may be analyzed by one or more data set analyzers 420 to categorize each data set, alignment, or detected sparse indicator. Additionally or alternatively, data sets may be analyzed by one or more data set analyzers 420 to score each data set, alignment, or detected sparse indicator. Again, sparse indicators, categories, and scores may be transmitted to and/or stored in results data store 430, which may be included in data store 372.

Detecting sparse indicators may include aligning each data set with a reference data set. The reference data set may include part of a full reference data set and/or may include a data set identified based on identifying median or mode data elements across a plurality of data set derived from samples from a population. In some instances, an alignment is determined to be accurate throughout the data set, and differences between the data set and reference data set can be represented as sparse indicators, each corresponding to one or more positions (e.g., relative to an axis of the reference data set or to an axis of the data set). In some instances, a sparse indicator may further be defined using a value or identifier data of the data set (e.g., that differs from a corresponding value in the reference data set). In some instances, a sparse indicator may be defined based on identifying a type of structural difference detected in the data set relative to the reference data set (e.g., duplication, insertion, inversion or deletion). In some instances, an alignment is determined to be accurate throughout part of the data set but not for another part. It may then be determined that such partial alignment is attributable to the data set, for example, lacking representation of a part of the reference sequence or having an additional set of values. A sparse indicator may therefore identify information corresponding to multiple positions (e.g., reflecting a start and stop of a part of a reference data set not represented in a data set or the converse) and/or multiple values (e.g., reflecting which values were in one of either the reference data set or the data set but not in the other).

In some instances, a state transition likelihood associated with a particular deviation (e.g., sparse indicator) and/or with a combination of deviations is unknown or is associated with a below-threshold confidence. With reference again to FIG. 1 and FIG. 2, upon detecting such a deviation or combination (or a threshold quantity thereof), the particular deviation and/or combination may be identified in a review-request communication 265 and transmitted to an evaluation device 170. Evaluation device 170 may then present the identification to an evaluator 175 and detect input that is indicative of an estimated likelihood to associate with the deviation and/or combination, for example, as part of an optional review analysis process. A review-request response 285 may be transmitted from evaluation device 170 to assessment system 105, for example, to provide the results of any review or input generated by an evaluator 175. The data included in review-request response 285 may be used in report generation process of block 290 and may be included and/or otherwise influence the content of the final report transmitted in report transmission 295.

A result generated by assessment system 105 may include a quantitative or qualitative (e.g., categorical) likelihood variable, such as one corresponding to a transitioning to a particular state. For example, the likelihood variable may include a percentage probability or range of transitioning into a particular state. As another example, the likelihood variable may be partitioned into three categories.

Assessment system 105 may generate an electronic report, at block 290, that includes the result and/or that is selected based on the result. A report communication or transmission 295 may include the report and be transmitted to client 125 or facility 120, such as by way of client device 130 or requestor device 110a. As an example, a report may identify one or more sparse indicators detected in a client identifier data set and/or a bucket of each of one or more sparse indicators. A report may identify a likelihood (e.g., numeric or categorical) of transitioning to a particular state and/or a technique for having generated such a result. A report may identify types of data (e.g., particular data-set units and/or other type of data) used in the analysis. A report may identify a confidence in a result (e.g., a likelihood variable). A report may identify a recommendation (e.g., to contact a requestor or to receive a particular test or evaluation).

In some instances, a report must be approved (e.g., by a requestor 115*a* or 115*b*) before it is transmitted to a client device 130. A report-reviewing interface may, but need not, include a configuration to allow a reviewing entity to change or add to the report. A report-reviewing interface may further allow or require a reviewing entity to identify a time at which to send the report to a client.

Assessment system 105 may update and may have access to a variety of data stores, part or all of which may be remote from, co-localized with assessment system 105, and/or included in assessment system 105. One or more of the data stores may include a relational data store, such that data from one data store or structure within a data store may be used to retrieve corresponding data from another data store or structure.

Each of one, more, or all of the data stores may be associated with one or more access constraints. Access constraints applicable to a given data store may be stored as part of the data store or separately (e.g., in an access control data store). Access constraints that apply to one type of data may differ from access constraints that apply to another type of data. For example, account and client data may be associated with stricter access constraints than results data, to make it more difficult for a user, developer, or hacker to be able to link data to a particular individual. An access constraint may identify one or more individuals, devices, systems, and/or occupations permitted to access some or all data in a data store. An access constraint may include a rule, such as one that indicates that a user is permitted to access data pertaining to any of a group of users that the entity was involved in with respect to a transfer of a kit, or that indicates that any low-level authorized user is permitted to access de-identified data but not identifiable data, or that indicates that a high-level authorized user is permitted to access all data. As another example, access constraints may indicate that process data is to be hidden from external developers and available to internal users; that data-set unit, sparse indicator, and data set availability data is to be made available to all authorized external developers and internal users; and that client data is to be availed to authorized internal users and only availed to external developers to the extent to which each corresponding users represented in the data is a user of the developer (e.g., and that the client authorized such data access).

When different access rights apply to different types of data, a query protocol may be established to address instances where a query relates to each type of data. For example, a query may request Variable X for each client corresponding to Data Y, and Variable X and Data Y may correspond to different access constraints. As another example, a query may request a count of clients for which both Data Y and Data Z was detected, and Data Y and Z may correspond to different access constraints. One example of a query protocol is to use a most restrictive overlap of data constraints applying to the query. Another example of a query protocol is to permit use of an at least partly more relaxed access constraint so long as it relates to defining a client set or state and not to results to be returned or processed.

In some instances, an access constraint is configured to inhibit an identification of particular data (e.g., client identity). Such a constraint may relate to a precision of requested data. To illustrate, a constraint may be configured to permit a user to request and receive data identifying client locations, so long as the request is configured to not request too specific of a location and/or so long as the request corresponds to a number of client data elements sufficiently large to obscure (e.g., in a statistical result) a precise location. Compound queries may be more sensitive to potential identification concerns, such that one or more access constraints are configured to permit access to less precise data when multiple data elements are being requested.

Various data stores may be included in assessment networks 100 and 300. The data stores may include, for example, an account data store 176, which may include login credentials for one or more users or clients and/or types of data access to be granted to each user or client; process data store 177, which may identify facility analysis characteristics pertaining to particular data elements (e.g., identifying a facility, piece of equipment, and/or processing time); data sets data store 178, which may identify one or more data sets associated with a given client or material, such as a sample; and one or more data-set expressions or signatures associated with a given client or material, such as a sample. The data stores may further or alternatively include a results data store 181, which may identify one or more sparse indicators identified by and/or one or more results generated by assessment system 105 that are associated with a given client or material, such as a sample.

The data stores may further or alternatively include a reports data store 182, which may include one or more report templates (e.g., each associated with one or more result types) and/or one or more reports to be transmitted or having been transmitted to a client device; and/or a relevance support data store 183, which may identify which types of data (e.g., data-set units, full or partial reference data sets, activity patterns, inputs, records, tests, etc.) are established to be, potentially, established not to be, or unknown whether to be relevant for evaluating a particular type of likelihood (e.g., a likelihood of transitioning into a particular state).

Relevance support data store 183 may include identifications of one or more content objects. The identifications may include, for example, web addresses, journal citations, or article identifiers. In some instances, an identification identifies one or more sources associated with the content object (e.g., scientist, author, journal, or data store). Content objects may be tagged with one or more tags, which may identify, for example, a sparse indicator, a data-set unit, a data set, and/or a type of assessment. In some instances, each of one or more content objects are associated with a score which may reflect a credibility of the content object. The score may be based, for example, on a publication frequency of a source, an impact factor of a source, a date of publication of the content object, and/or a number of citations to the content object.

It will be appreciated that the illustrated data stores 155, 165, 176, 177, 178, 181, 182, and 183 may each, independently and optionally, be included as a portion of data store 372, which may include a relational database, for example.

Assessment network 100 may also include a user device 180 configured to detect input from a user 185. User 185 may be associated with an account or other authentication data indicating that access to some or all of the data is to be granted. Accordingly, user 185 may be able to interact with various interfaces (presented at user device 180) to view data pertaining to one or more particular clients (e.g., in an identified or de-identified manner), to view summary data that relates to data from multiple clients, to explore relationships between data types, and so on. In some instances, an interface may be configured to accept inputs from a user 185 so as to enable the user to request data pertaining to (for example) materials with sparse indicators in particular data-set units, particular sparse indicators and/or state likelihoods.

In some instances, data is transmitted by assessment system 105 and received at user device 180. The transmitted data may relate to durations of work flow processing time periods. Specifically, as may be appreciated by disclosures included herein, generating outputs for users and/or requestors may involve multiple steps, each of which may include a process, which may be referred to herein as a task, of an entity and/or device. Completion times of individual processes may then be monitored and assessed. A work flow may include a structure and definition for these processes. For example, various work flows may include some or all of the following tasks:

Inputs are collected at client device 130, transmitted by client device 130, and received by assessment system 105, where the inputs correspond to a preliminary request to conduct an assessment based on a material and ensure that all required inputs have been received;

A same or different client device 130 (e.g., a wearable device) collects and transmits other data indicative of the client's activity or status;

Inputs collected at requestor device 110a, 110b and transmitted to assessment system 105 that correspond to a request for assessment for the client;

Access control device 160b at facility 120 collects and transmits record data of the client;

Distribution device 135 receives alert corresponding to new request and address information and confirms shipping of kit for sample collection to the client;

Client 125 receives kit, collects material and sends to data generator 140;

Assessment device(s) 145 collects data-set data, and access control device 160a sends facility data to assessment system 105;

Assessment system 105 detects any sparse indicators in data set(s) and/or any modifications in data set expression;

Assessment system 105 assigns any sparse indicators and/or data set availability modifications;

Evaluation device 170 collects inputs identifying an assignment of any sparse indicators and/or data set availability modifications as of an unknown likelihood;

Confirmatory facility testing of any sample associated with a sparse indicator and/or data set availability modification having a particular assignment at same or different facilities;

Assessment system 105 aggregates sparse indicator data, assignment data, record data, user or client inputs, other data, and/or activity or status data and generates one or more likelihood variables;

Assessment system 105 generates electronic report with the one or more likelihood variables;

Evaluation device 170 and/or requestor device 110a collect inputs indicating that the electronic report is approved for transmission to client device 130; and Assessment system 105 transmits the electronic report to client device 130.

A work flow may include a task order that indicates that, for example, a first task is to be completed prior to performance of a second task, though a work flow may alternatively be configured such that at least some tasks may be performed in parallel. In some instances, one or more tasks in a work flow are conditional tasks that need not be performed during each iteration of the work flow. Rather, whether a conditional task is to be performed may depend on a circumstance, such as whether a result from a prior task is of a particular type or exceeds a threshold.

Using a work flow, assessment system 105 may track timing of individual tasks during individual iterations of a work flow. Each iteration may correspond to generating a likelihood variable for a given client and may involve various other entities (e.g., reviewers, facilities, etc.), which may be selected based on, for example, user preference, a physical location of a client device, and/or availability. For tasks performed at assessment system 105, timing may be directly determined. For tasks performed by, at, and/or via another device, assessment system 105 may track timing via electronic transmissions between systems. For example, a start may be identified by an instruction communication sent from assessment system 105 and/or a when a communication was received indicating that the corresponding task was beginning. As another example, an end time may be identified by transmission of a communication including a result of the corresponding task sent from assessment system 105 and/or when a communication was received indicating that the corresponding task was complete.

Figure 5:
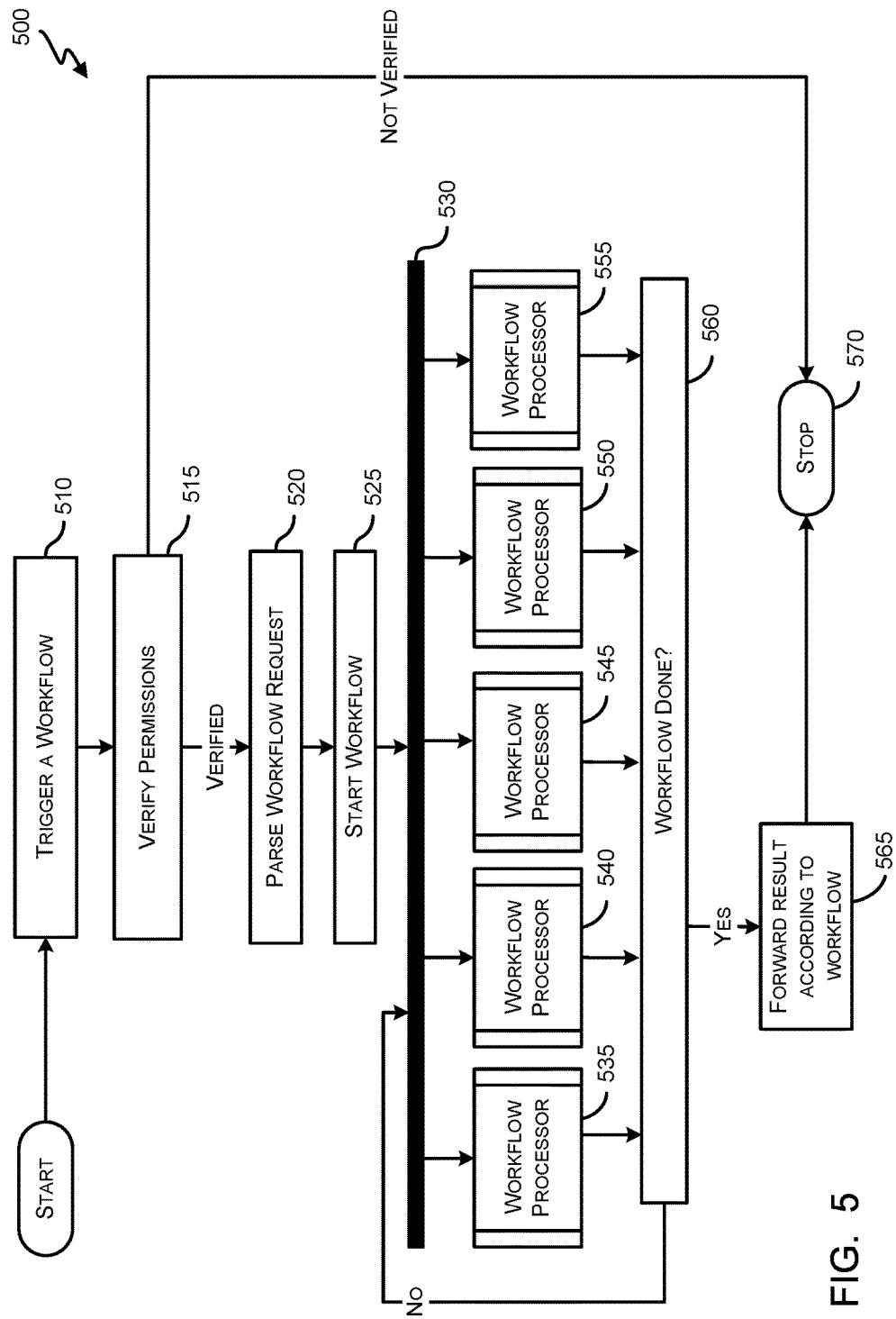
FIG. 5 shows an illustration of a work flow iteration, in accordance with some embodiments.

FIG. 5 shows a representation of an embodiment of a process 500 for processing tasks in the assessment network 100. The process starts when an event triggers a first work flow as shown at block 510. Any number of events occurring internal to the assessment network 100 and external to the assessment network 100 may trigger a first work flow in any number of ways. Each of the assessment system 105, a requestor device 110, a client device 130, a distribution device 135, a facility data generator, an evaluation device 170, a user device 180, and an external assessment device 190 may trigger a work flow, for example. For instance, the assessment system 105 may trigger a work flow when it receives an electronic request 205. A requestor device 110 may trigger a work flow by transmitting electronic request 205. A user device may trigger a work flow based on inputs collected. A data generator 140 may trigger a work flow upon receipt of a sample. Other examples are possible and it will be appreciated from the present description that any one or more data transmissions between various devices and systems of assessment network 100 may trigger a work flow. It will also be appreciated that various work flows may initiated sequentially or simultaneously, depending on the particular need for completion of one work flow to complete before another work flow may begin. In addition, additional work flows may be triggered while in the midst of processing one work flow. In some embodiments, an assessment system or assessment device manages and/or coordinates triggered work flows. Optionally, task start times may be tracked, as described above, and triggering a work flow may include tracking the start time of tasks associated with the work flow.

Some task work flows may require verification of permissions and/or authorizations, such as depicted at block 515, before the work flow is permitted to begin. For example, a transmission of record data of a client may require explicit authorization from a client or a requestor before the transmission may begin, for example, due to the sensitivity of information that may be included in the record data. As another example, transmission of information of a client to an external assessment device may also require client permission. In this way, permission verification may prevent unanticipated or unauthorized transmission of information to a particular work flow processor for which such transmission may be undesirable. Timing of permission request and verification may further be tracked, such as to allow identification of bottlenecks in work flow and/or task processing associated with permission verification. U.S. patent application Ser. No. 15/133,089, filed on Apr. 19, 2016 and U.S. Provisional Applications 62/150,218, filed on Apr. 20, 2016, and 62/274,660, filed on Jan. 4, 2016, disclose details regarding various work flow processes, and are each hereby incorporated by reference in its entirety for all purposes.

As illustrated in FIG. 5, if permissions are not verified, the work flow may be stopped, at block 570. If permissions are verified, the work flow may proceed to block 520. It will be appreciated that not all work flows require permission verification, and so block 515 may be considered to be optional.

Depending on the particular work flow initiated, the work flow request may require parsing, at block 520, to ensure that various portions of the work flow may be handled appropriately. Parsing may include determining that all required inputs, data, and/or materials needed for completing the work flow are available. In the event that additional inputs, data, and/or materials are needed, the work flow may be returned to the triggering device to request the additional inputs, data, and/or materials, for example. Parsing may also include aspects of load-balancing. Parsing may also include, for example, analyzing the work flow request and associated data and/or materials to ensure the data, materials and/or multiple individual sub-work flow processes are directed to an appropriate work flow processor 535, 540, 545, 550, 555, etc. Task start times may optionally be tracked based on completion of parsing a work flow request, for example.

In one embodiment, a work flow may correspond to performing a data set analysis on a sample, which may include dividing the sample into sub-samples. The sub-samples may, for example, be redundantly analyzed to ensure accuracy. Parsing 520 may include identifying necessary resources for completing a particular work flow.

After parsing the work flow request, the triggered work flow is started, at block 525. Optionally, synchronizer 530 oversees the processing of individual work flow processes by work flow processors. Optionally, tracked task start times may correspond to times at which the triggered work flow is actually passed to a work flow processor.

Some task work flows may include multiple individual work flow processes, such as a sequencing work flow for sequencing data-set unit data or sparse indicator data from a sample, where each individual work flow process may correspond to, for example, one or more data sets. These individual work flow processes may be performed in series, for example, such as if a particular work flow process requires input from a previous work flow process. The individual work flow processes may alternatively be performed in parallel, for example, if the separate work flow processes do not rely on an a result from another work flow process that may be performed simultaneously. Additionally, individual work flow processes may be started and completed without regard to other work flow processes that may be operating. Upon a work flow processor 535, 540, 545, 550, 555 completing the designated tasks, at 560, the work flow may be evaluated to determine whether the work flow is completed. If additional processing is required, the work flow may return to synchronizer 530 for appropriate queuing. If no additional processing is required, the work flow result may be forwarded as appropriate, at 565. Once a particular work flow is forwarded, the task associated with the work flow may stop, at block 570. Optionally, task stop or end times may be tracked based on the time at which a work flow proceeds to stop at block 570.

Assessment system 105 may store task start and completion times, and/or task completion time periods (i.e., a difference between corresponding task completion and task start times) in process data store 177 in association with an identifier of the corresponding task and an identifier of a corresponding work flow iteration (e.g., an identifier of a client or sample). Assessment system 105 may collect task start and completion times that correspond, for example, to a given time period, facility, user or client group, analysis type, etc. and analyze the data at a population level. Through such analysis, assessment system 105 may identify average, median, or mode completion time periods for individual tasks so as to identify tasks, facilities, or entities associated with work flow processing delay. Further or alternatively, assessment system 105 may identify a backlog for individual tasks by identifying a number of "open" tasks for which a start time has been identified but for which no completion time is identified. Tasks, facilities, and/or entities associated with high backlog may then be identified.

Such task completion time monitoring may be performed automatically and/or in response to a query communication from user device 180. For example, assessment system 105 may determine, for each handling entity (e.g., facility, distribution device, reviewer, or facility) a portion of tasks completed by a first threshold time identified for a given task. Upon detecting that the portion exceeds a second threshold, an alert communication may be transmitted to user device 180 and/or a device of an associated entity. As another example, assessment system 105 may present a statistic (e.g., mean) corresponding to a processing time of each task in a work flow. The presentation may be interactive, such that more details about a statistic may be presented in response to a user selection of the statistic. For example, the statistic may be broken down by entity and/or task start time period, or more detailed information (e.g., a distribution or list of start and completion times) may be presented.

In some instances, data transmitted from assessment system 105 to user device 180 may relate to data queries received from user device 180. The query may, in some instances, include one that specifically or implicitly identifies one or more data-set units. For example, identification of a given kit or assessment may be associated with one or more data-set units. Assessment system 105 may identify data that any access constraints indicate are accessible to the user, and present high-level population data. For example, assessment system 105 may identify a portion of clients for which any sparse indicator or a particular sparse indicator was detected at each of the one or more data-set units. Such data may be presented in an interactive manner, such that a user may select a represented portion of the data to drill down into that data. For example, the interface may accept a selection of a representation of each data-set unit, and the interface may be updated to identify a distribution of particular sparse indicators detected at the data-set unit.

A drill-down may be configured to, at some level, begin representing non-data set data. For example, a selection of a particular sparse indicator or data-set unit may result in a display identifying a distribution of history data or demographic data from amongst clients associated with the particular sparse indicator or a sparse indicator at the data-set unit. Thus, the drill-down may include retrieving data from different data stores depending on a level of precision. Further, each step in the drill-down may involve evaluating one or more applicable access constraints.

In some instances, a query may pertain to one or more data-set units, and query processing may include retrieving data (or results derived therefrom) and retrieving data set availability data (or results derived therefrom). For example, query processing may include identifying, for each subject and for each of the one or more data-set units, whether a sparse indicator or an data set availability modification was detected. A query result presentation may identify, for example, a portion of subjects for which a sparse indicator or modification was detected for each of the data-set units and/or a query result presentation may identify, for each of the one or more data-set units, a portion of subjects or clients for which a particular type of sparse indicator or modification was detected. The presentation may again be configured to accept drill-down inputs so as to enable a user to further explore the pertinent data.

As another example, query processing may include identifying instances in which, for a given client, both a sparse indicator (e.g., generally or of a particular type) and an data set availability modification (e.g., generally or of a particular type) was detected (e.g., generally, at a particular data-set unit and/or at a particular position at a data-set unit).

Again with reference to FIG. 1, assessment network 100 may also include an external assessment device 190 configured to detect input from a developer 195. Via such inputs, external assessment device 190 may send electronic requests for data (e.g., relating to particular data-set units, a particular user or client and/or particular user or client inputs) to assessment system 105. The inputs may be received, for example, via a webpage, application, or app page, which may identify general types of data that is available for restricted access. Assessment system 105 may evaluate the request to determine, for example, whether a corresponding client 125 authorized such access (which may be verified via a communication exchange between assessment system 105 and client device 130) and/or whether such access is relevant to a purported type of analysis.

The evaluation may include assessing one or more permissions associated with a given user or client. In various instances, a permission may be set to be conditioned upon an entity or system transmitting a request, a type of data being requested, a size of data being requested, or a potential type of processing identified as being a use for the data. For example, a client may specify that an external assessment device may be granted access to data, such as data that includes data sets or sparse indicator detections, if the requested data pertains to fewer than a first threshold number of data-set units, that access to data that includes sparse indicator detection may be granted if the requested data pertains to fewer than a second threshold number of data-set units, and that access to the data is to be otherwise restricted.

Evaluation processing may depend, in part, on whether a system or entity associated with a request has provided any data previously or presently and/or what type of data is being provided. For example, external assessment devices and/or associated systems may provide data (e.g., generated from an external facility and/or client sample), results data, input data, data set availability data, test data, and/or history data.

Evaluation processing may depend on one or more permissions or restrictions associated with a request. The permissions or restrictions may be set, for example, based on client input, or lack thereof, and/or based on which type of analysis and/or data storage was initially agreed to by a client. For example, an interface may be configured so as to enable a user or client to permit or restrict storage of particular types of data (e.g., data sets and/or sparse indicator detection beyond what is needed to perform a requested analysis), to permit or restrict sharing data to one or more other entities (e.g., generally, of a given type or specific entities), and/or to permit or restrict using data to perform one or more other types of analyses. Permissions or restrictions pertaining to whether various analyses may be particularly important given that rules or regulations may require particular results of analyses to be transmitted to a client. Thus, if such information is not desired, analyses must be restricted.

In some instances, an interface may be configured to enable a user or client to specify a degree of identification to be associated with data of the client with regard to storage and/or distribution. For example, a user or client may be able to indicate that data and/or results are to be associated with a pseudo-randomly generated unique identifier of the client rather than client identifying information. As another example, a client may be able to indicate that data is to be stored so as to require a key for access, which may be held by the client. As another example, a client may authorize transmission of the client's data to external assessment devices so long as identifying information of the client (e.g., name, email, address, social security number, phone number, and so on) is not provided without subsequent explicit permission.

In some instances, a same or different permission may be established to apply to other type of data (e.g., with regard to storage and/or distribution), such as personal data, inputs and/or sensor data. In some instances, a same or different permission may be established so as to relate to data collected from external systems. For example, a permission may indicate whether an assessment system is authorized to request physician-system data (and/or what type of data), an external assessment device-data, etc., and/or how an assessment is to handle results provided by an external system.

If the evaluation indicates that access is to be granted, assessment system 105 may, for example, send an instruction communication to data generator 140 to conduct a new analysis of an existing sample, send a data request to a device (e.g., access control device 160*b*, client device 130), and/or retrieve data from a data store (e.g., and extract pertinent information from any larger data structure, such as extracting data-set unit-specific data from a reference data-set). When part or all of the data is accessible, one or more communications may be transmitted to the developer. The one or more meetings may include the data and/or may include information (e.g., access credentials, login information, or ftp IP address and credential information) to enable the developer to access the data. In some instances, other data different from that which was requested may be provided. The other data may include, for example, quality control metrics of the provided data, other data determined to be relevant to an analysis, and/or other data that is being provided in lieu part or all of data that had been requested.

Various devices in assessment network 100 may communicate with one or more other devices in assessment network 100 via a network, such as a communication system, the Internet, a local-area network, or a short-range network. Communications may be sent in a secure manner to, e.g., inhibit unauthorized access to health-record data. Techniques such as token authentication and/or encryption may be used.

It will be appreciated that the representations of devices and configurations depicted in FIGS. 1, 2, and 3 are illustrative. For example, while a single data generator 140, client device 130, and data stores 178, etc., are shown, a system may include multiple data generators 140, client devices 130, data store 178, etc. As another example, while access control devices 160*a*, 160*b* are shown as being connected to data store 155 and record data store 165, additional access control devices may be present in assessment network 100. For example, an access control device 105 may be included within or connected to assessment system 105 so as to control access that requestor device 110b, client device 130, distribution device 135, evaluation device 170, user device 180 and/or external assessment device 190 may achieve.

Figure 6:
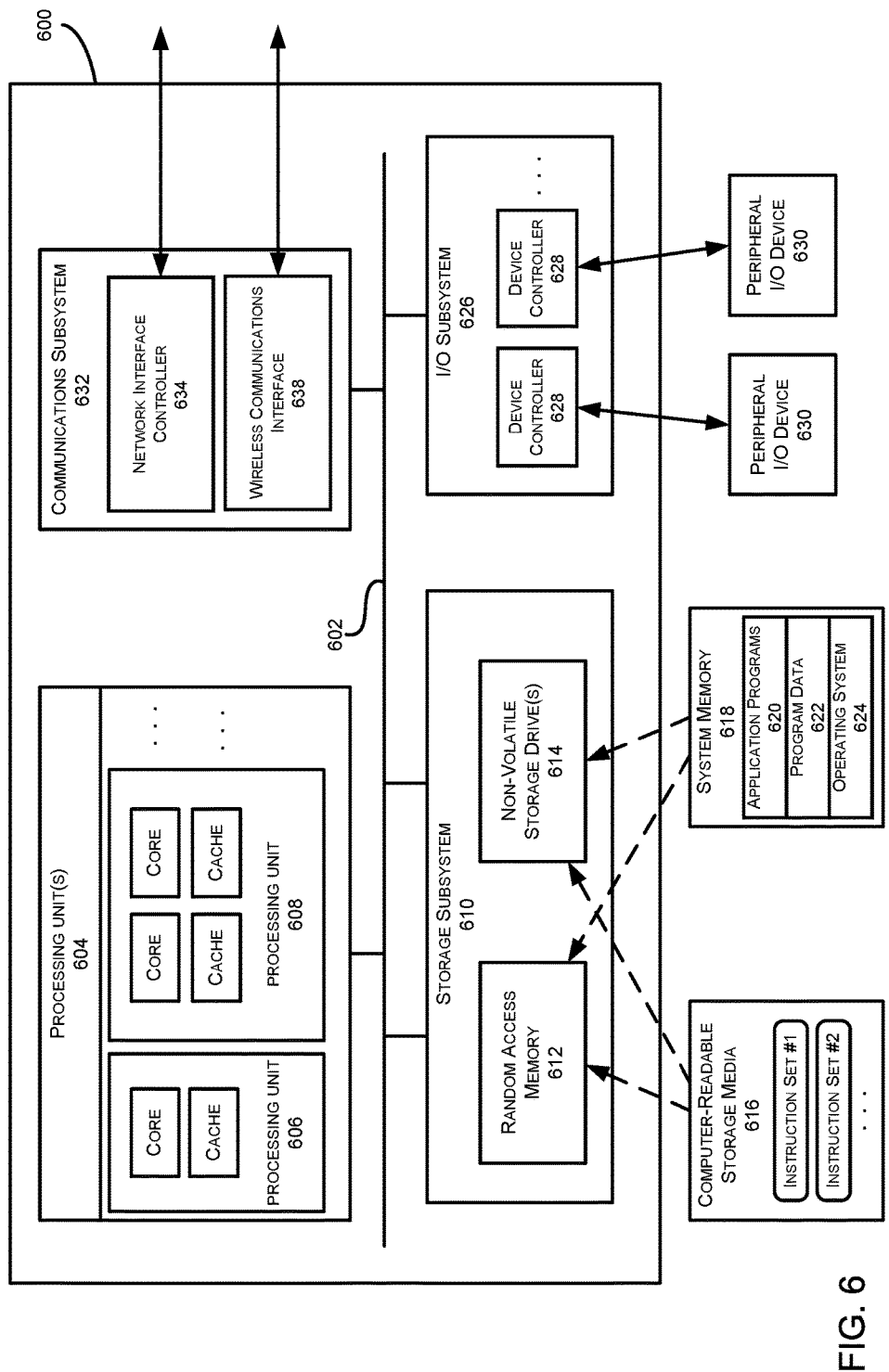
FIG. 6 shows a block diagram of an example data processing network device or system, in accordance with some embodiments.

With reference now to FIG. 6, a block diagram of an illustrative assessment network device 600 is shown. The device 600 may correspond to any of the devices or systems of the assessment network 100 described above, or any other computing devices described herein, and specifically may include, for example, one or several of an assessment system 105, a requestor device 110, a client device 130, a distribution device 135, an assessment device 145, a technician device 150, an access control device 160a, a reviewer device 180, an external assessment device 190, external system 249, data-characterizer device 410, data set analyzer 420, and/or any of the work flow processors 535, 540, 545, 550, and 555. Aspects of device 600 may further be incorporated in one or more of data stores 155, 165, 176, 177, 178, 181, 182, 183, 415, 425, and 430 and data store 372. It will be appreciated that each of the devices referred to that may correspond to an instance of device 600 may be independent and unique from all other instances of device 600 and may include fewer or additional components as those illustrated in FIG. 6.

In the example illustrated in FIG. 6, device 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of device 600 communicate with each other. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

Processing unit 604, which may be implemented as one or more integrated circuits (e.g., a conventional microprocessor or microcontroller), controls the operation of device 600. Processing unit 604 may be implemented as a special purpose processor, such an application-specific integrated circuit, which may be customized for a particular use and not usable for general-purpose use. One or more processors, including single core and/or multicore processors, may be included in processing unit 604. As shown in FIG. 6, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater).

Processing unit 604 may execute a variety of software processes embodied in program code, and may maintain multiple concurrently executing programs or processes. At any given time, some or all of the program code to be executed may be resident in processor(s) 604 and/or in storage subsystem 610. In some embodiments, device 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with device 600 (e.g., integrated audio/video systems, and/or touchscreen displays), or may be separate peripheral devices which are attachable/detachable from device 600. The I/O subsystem 626 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, haptic devices, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, haptic devices, and the like. In general, use of the term "output device" is intended to include all possible types of devices and mechanisms for outputting information from device 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Device 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs. Program instructions may include instructions to perform one or more actions or part(s) or all of one or more methods or processes described herein. For example, program instructions may include instructions for identifying and/or aligning sparse indicators. Program instructions may include instructions for generating, transmitting, and/or receiving communications. Program instructions may include instructions for automated processing. Program instructions may include instructions for generating automated processing and/or stage results. Program instructions may include instructions for performing a work flow iteration.

Depending on the configuration and type of device 600, system memory 618 may be stored in volatile memory (such as random access memory (RAM) 512) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within device 600, such as during start-up, may typically be stored in the non-volatile storage drives 614. By way of example, and not limitation, system memory 618 may include application programs 620, such as user applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that may further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This may include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer-readable media, such as data signals, data transmissions, or any other medium that may be used to transmit the desired information and that may be accessed by device 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray disk, or other optical media. Computer-readable storage media 616 may include, but is not limited to, Zip drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for device 600.

Communications subsystem 632 may provide a communication interface from device 600 and remote computing devices via one or more communication networks, including local area networks (LANs), wide area networks (WANs) (e.g., the Internet), and various wireless telecommunications networks. As illustrated in FIG. 6, the communications subsystem 632 may include, for example, one or more network interface controllers (NICs) 634, such as Ethernet cards, Asynchronous Transfer Mode NICs, Token Ring NICs, and the like, as well as one or more wireless communications interfaces 638, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire interfaces, USB interfaces, and the like. Communications subsystem 632 also may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

The various physical components of the communications subsystem 632 may be detachable components coupled to the device 600 via a computer network, a FireWire bus, a serial bus, or the like, and/or may be physically integrated onto a motherboard or circuit board of device 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access device 600. For example, communications subsystem 632 may be configured to receive data feeds in real-time from other communication services, web feeds such as Rich Site Summary (RSS) feeds, and/or real-time updates from one or more third party information sources. Additionally, communications subsystem 632 may be configured to receive data in the form of continuous data streams, which may include event streams of real-time events and/or event updates (e.g., data set completion, results transmission, other data transmission, report transmission, etc.). Communications subsystem 632 may output such structured and/or unstructured data feeds, event streams, event updates, and the like to one or more data stores that may be in communication with device 600.

Due to the ever-changing nature of computers and networks, the description of device 600 depicted in FIG. 6 is intended only as a specific example. Many other configurations having more or fewer components than the device depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, it will be appreciated that there are other ways and/or methods to implement the various embodiments.

Figure 7:
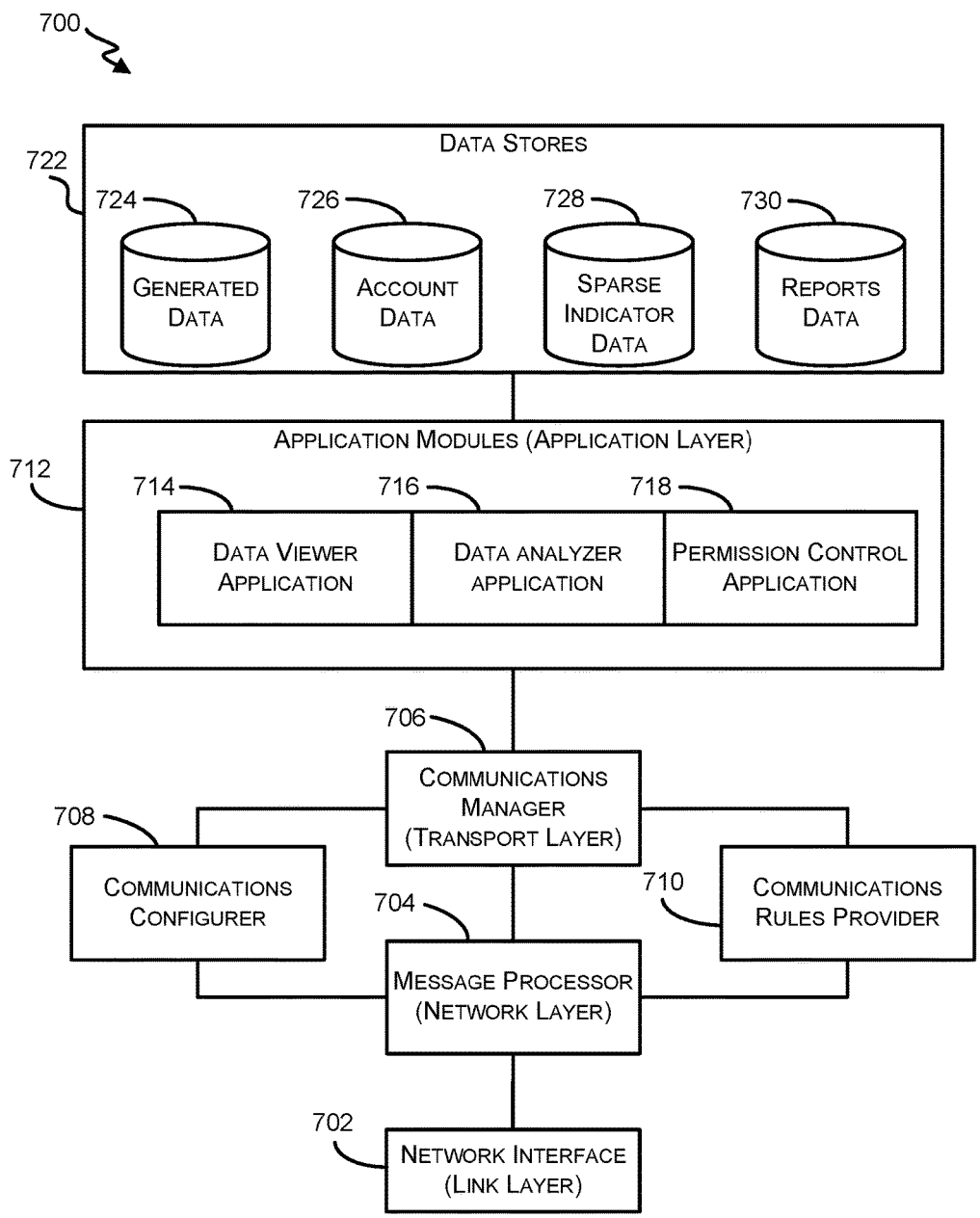
FIG. 7 illustrates components of a data processing network device or system, in accordance with some embodiments.

With reference now to FIG. 7, a diagram of components of an illustrative assessment network device 700 is shown. The device 700 may correspond to any of the devices or systems of the assessment network 100 described above, or any other computing devices described herein, and specifically may include, for example, one or several of an assessment system 105, a requestor device 110, a client device 130, a distribution device 135, an assessment device 145, a technician device 150, an access control device 160a, a reviewer device 180, an external assessment device 190, external system 249, data-characterizer device 410, data set analyzer 420, any of the work flow processors 535, 540, 545, 550, and 555, and/or device 600. Aspects of device 700 may further be incorporated in one or more of data stores 155, 165, 176, 177, 178, 181, 182, 183, 415, 425, and 430, and data store 372. It will be appreciated that each of the devices referred to that may correspond to an instance of device 700 may be independent and unique from all other instances of device 700 and may include fewer or additional components as those illustrated in FIG. 7.

Various components may be included in device 700. Components may include some or all of the following: a network interface 702 (which may operate in or function as a link layer of a protocol stack), a message processor 704 (which may operate in or function as a network layer of a protocol stack), a communications manager 706 (which may operate in or function as a transport layer of a protocol stack), a communications configurer 708 (which may operate in or function as a portion of transport and/or network layer in a protocol stack), a communications rules provider 710 (which may operate in or function as part of a transport and/or network layer in a protocol stack), and applications 712 (which may operate in or function as an application layer of a protocol stack).

Network interface 702 receives and transmits messages via one or more hardware components that provide a link-layer interconnect. The hardware components associated with network interface 702 may include, for example, a radio frequency (RF) antenna or a port (e.g., Ethernet port) and supporting circuitry. In some embodiments, network interface 702 may be configured to support wireless communication, e.g., using Wi-Fi (IEEE 802.11 family standards), Bluetooth, or other wireless communications standards.

The RF antenna, if present, may be configured to convert electric signals into radio and/or magnetic signals (e.g., to radio waves) to transmit to another device and/or to receive radio and/or magnetic signals and convert them to electric signals. RF antenna may be tuned to operate within a particular frequency band. In some instances, device 700 includes multiple antennas, and the antennas may be, for example, physically separated. In some instances, antennas differ with respect to radiation patterns, polarizations, take-off angle gain and/or tuning bands. Network interface 702 may include one or more phase shifters, filters, attenuators, amplifiers, switches and/or other components to demodulate received signals, coordinate signal transmission and/or facilitate high-quality signal transmission and receipt using the RF antenna.

In some instances, network interface 702 includes a virtual network interface, so as to enable the device to utilize an intermediate device for signal transmission or reception. For example, network interface 702 may include or utilize virtual private networking (VPN) software.

Network interface 702 may be configured to transmit and receive signals over one or more connection types. For example, network interface may be configured to transmit and receive Wi-Fi signals, Ethernet signals, cellular signals, Bluetooth signals, etc.

Message processor 704 may coordinate communication with other electronic devices or systems, such as one or more user devices, requestor devices, assessment systems, data stores, assessment devices, distribution device, reviewer device, etc. In one instance, message processor 704 is able to communicate using a plurality of protocols (e.g., any known, future and/or convenient protocol such as, but not limited to, internet protocol (IP), short message service, (SMS), multimedia message service (MMS), etc.). Message processor 704 may further optionally serialize incoming and/or outgoing messages and facilitate queuing of incoming and outgoing message traffic.

Message processor 704 may perform functions of an Internet or network layer in a network protocol stack. For example, in some instances, message processor 704 may format data packets or segments, combine data packet fragments, fragment data packets and/or identify destination applications and/or device addresses. For example, message processor 704 may defragment and analyze an incoming message to determine whether it is to be forwarded to another device and, if so, may address and fragment the message before sending it to the network interface 702 to be transmitted. As another example, message processor 704 may defragment and analyze an incoming message to identify a destination application that is to receive the message and may then direct the message (e.g., via a transport layer) to the application.

Communications manager 706 may implement transport-layer functions. For example, communications manager 706 may identify a transport protocol for an outgoing message (e.g., transmission control protocol (TCP) or user diagram protocol (UDP)) and appropriately encapsulate the message into transport protocol data units. Message processor 704 may initiate establishment of connections between devices, monitor transmissions failures, control data transmission rates, and monitor transmission quality. As another example, communications manager 706 may read a header of an incoming message to identify an application layer protocol used to receive the message's data. The data may be separated from the header and sent to the appropriate application. Message processor 704 may also monitor the quality of incoming messages, detect out of order incoming packets, detect missing packets, reorder out of order packets, request retransmission of missing packets, request retransmission of out of order packets, etc.

In some instances, characteristics of message-receipt or message-transmission quality may be used to identify a quality status of an established communications link. In some instances, communications manager 706 may be configured to detect signals indicating the stability of an established communications link (e.g., a periodic signal from the other device system, which if received without dropouts, indicates a stable link).

In some instances, a communication configurer 708 is provided to track attributes of another system so as to facilitate establishment of a communication session. In one embodiment, communication configurer 708 further ensures that inter-device communications are conducted in accordance with the identified communication attributes and/or rules. Communication configurer 708 may maintain an updated record of the communication attributes of one or more devices or systems. In one embodiment, communications configurer 708 ensures that communications manager 706 may deliver the payload provided by message processor 704 to the destination (e.g., by ensuring that the correct protocol corresponding to the receiving system is used). Optionally, communications configurer 708 may reformat, encapsulate, or otherwise modify the messages directed to the message processor 704 to ensure that the message processor 704 is able to adequately facilitate transmission of the messages to their ultimate destination.

A communications rules provider 710 may implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule may identify a technique for selecting between a set of potential destination devices based on attributes of the set of potential destination devices as tracked by communication configure 708. To illustrate, a device having a short response latency may be selected as a destination device. As another example, communications rules provider 710 may maintain associations between various devices or systems and resources. Thus, messages corresponding to particular resources may be selectively transmitted to destinations having access to such resources.

A variety of applications 712 may be configured to initiate message transmission, process incoming transmissions, facilitate permissions requests for access to protected data, facilitate automatic access to protected data, facilitate task work flow permission verification, and/or performing other functions. In the instance depicted in FIG. 7, application modules 712 include a data viewer application 714, a data analyzer application 716, and/or a permission control application 718. It will be appreciated that the application modules depicted in FIG. 7 are merely examples and other example application modules are include, but are not limited to, one that is associated with aspects of part or all of each of one or more actions, methods, and/or processes disclosed herein.

Data stores 722 may store data for use by application modules 712, as necessary, and may include, for example, generated data store 724, account data store 726, sparse indicator data store 728, and reports data store 730. Optionally, data store 372 may be included in data stores 722. It will be appreciated that fewer or more or different data stores than those illustrated in FIG. 7 may be included in data stores 722, such as any one or more of data stores 155, 165, 176, 177, 178, 181, 182, and 183 depicted in FIG. 1.

One or more of data stores 724, 726, 728, and 730 may be a relational data store, such that elements in one data store may be referenced within another data store. For example, account data store 726 may associate an identifier of a particular account with an identifier of a particular user or client. Additional information about the user may then be retrieved by looking up the account identifier in sparse indicator data store 728, for example.

The components illustrated in FIG. 7 may be useful for establishing data communications and exchanging data between various other systems. For example, independent instances of device 700 may represent the requestor device 110 and the assessment system 105 illustrated in FIGS. 1 and 2. Other examples are possible.

As an example, data analyzer application 716 may perform alignment of data sets, request reference data, determine sparse indicators, determine scores, determine buckets, etc. Such actions may be performed in response to messages received by device 700 from another instance of device 700. If data that is unavailable locally in device 700 is needed by an application module 712, a request may be transmitted by device 700, first by generating the request, forwarding the request to communications manager 706, which then may process and modify the request as necessary for subsequent handling by message processor 704. In turn, message processor 704 may process and modify the request as necessary, such as by adding header and/or footer information, for subsequent handling by network interface 702. Network interface 702 may then perform further processing and modification of the request, such as by adding additional header and/or footer information, and then facilitate transmission of the request to a remote system, such as an external system that may possess the needed data.

Figure 8:
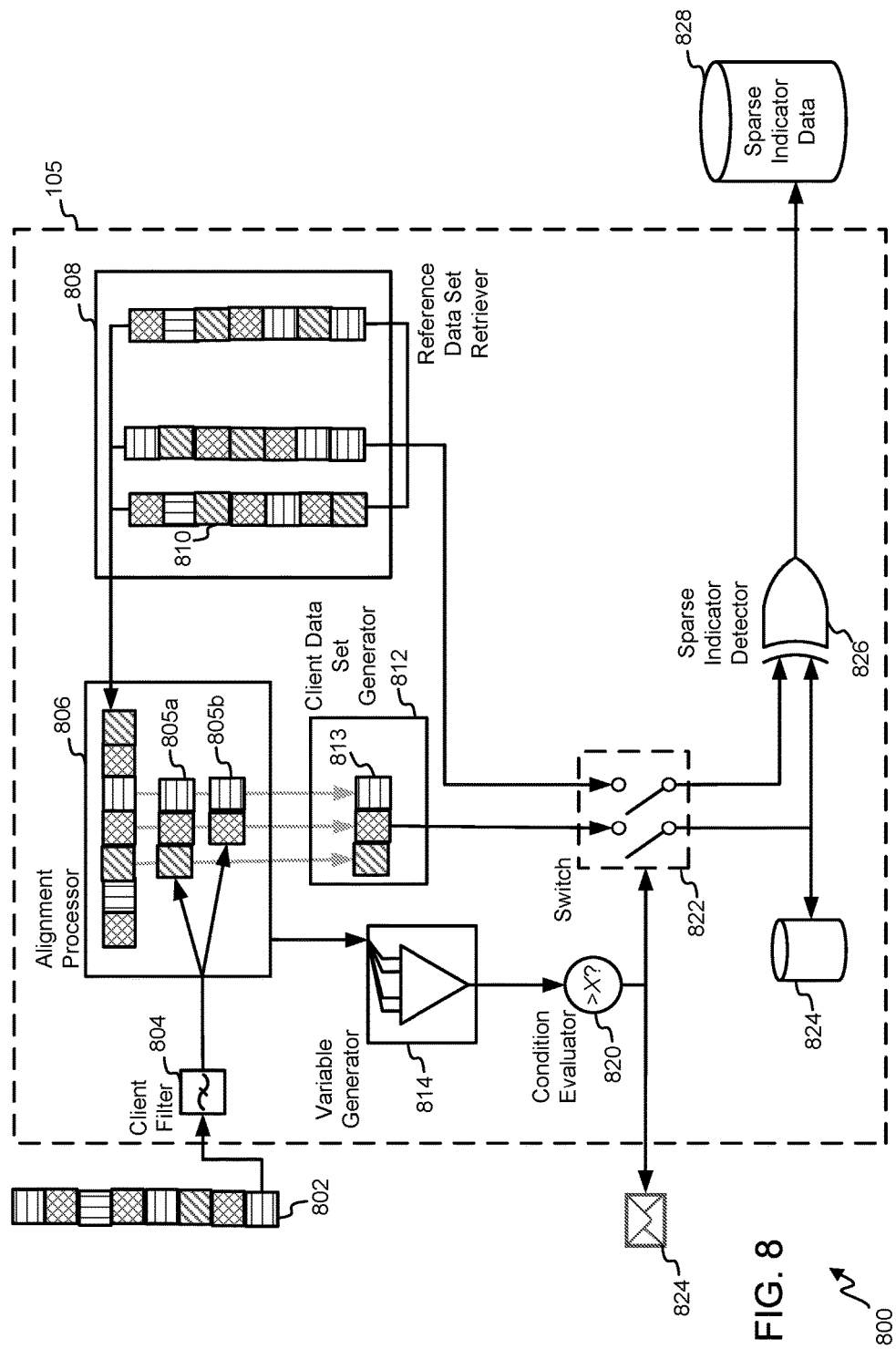
FIG. 8 shows a representation of a real-time processing of reads, in accordance with some embodiments.

Referring next to FIG. 8, a representation of real-time processing 800 of reads is shown. The processing may be performed by an assessment system such as assessment system 105. A data stream 802 containing a plurality of reads is received at assessment system 105 from a data source such as data generator 140. Data stream 802 can include (for example) data received continuously, over a period of time, from assessment system 105 or data received across a series of discrete communications from assessment system 105 (e.g., with a delay of variable or fixed duration) between successive communications. Data stream 802 may be transmitted to assessment system 105 in a batch-mode, in a streaming mode, in real-time as each read is produced, and/or upon request. Data stream 202 may also be stored at a data store local or remote to data generator 140. Data stream 202 can include data corresponding to one or more particular clients. For example, data stream 202 can include a plurality of reads associated with a particular client. In instances where data stream 202 includes multiple discrete communications, each of the multiple discrete communications may include one or more of the plurality of reads.

While data stream 202 is being received, (e.g., before each of the plurality of reads are received, before an indication has been received that indicates that transmission of read data for a particular client is complete, or before assessment system 105 sends an indication to cease transmission of read data for an identified particular client), processing of the data begins. For example, a client filter 804 may detect and/or extract, within data stream 202, each of a set of reads 805 of a plurality of reads 803 that correspond to a particular client. The detection may include detecting each of set of reads 805 and extracting an identifier associated with each of set of reads 805 (e.g., and comparing the identifier to one or more stored identifiers). It will be appreciated that, in one instance, assessment system 105 may include multiple client filters so as to detect data from each of multiple clients, or a single client filter 804 may be configured to detect which of multiple clients set of reads 805 corresponds.

An alignment processor 806 aligns each of set of reads 805 (e.g., in real-time as the reads are detected) to a portion of a reference data set 810. In some instances, the reference data set 810 includes a set of identifiers associated with an order along a dimension (e.g., a vector of identifiers). The portion can correspond to a subset (e.g., of consecutive positions) of the set of identifiers. Thus, for example, the portion may be defined by a start position, end position, position range and/or length. In some instances, the portion can correspond to, for example, part or all of one or more units of reference data set 810 (e.g., each of which may be associated with part of the set of identifiers). It will be appreciated that, with respect to data for a particular client, reads associated with the client may be aligned to corresponding portions of the reference data set concurrently, in batch mode, as data is received and/or in response to detecting satisfaction of another condition.

A variety of alignment techniques may be used, including those discussed previously. One technique may involve using a cost function to evaluate multiple potential alignments and identifying an alignment associated with a lowest cost. Upon identifying a portion of reference data set 810 to which a read corresponds, a reference data set retriever 808 may retrieve different and/or additional reference data sets to which set of reads 805 may also correspond. A retrieved reference data set may be a larger version of the reference data set initially used in order to reduce the initial computational burden on the system. Alternatively, when alignment processor 806 is unable to align one or more of set of reads 805 to reference data set 810, reference data set retriever 808 may provide additional, different reference data sets which may provide alignment.

In some instances, a plurality of reads is associated with an assessment of a client sample, and aligning each read of the plurality of reads is performed over the course of a time period. One advantage of aligning reads prior to receipt of all of the plurality of reads is to facilitate processing of alignment results expediently. In some instances, post-alignment processing (or queuing data for the same) commences upon generation of individual alignment results. In some instances, an alignment condition is to be satisfied to trigger such post-alignment processing. For example, an alignment condition may identify an absolute or functionally described quantity of reads that are to have been aligned (e.g., generally and/or at one or more specific parts of a reference data set) to satisfy the condition. More sophisticated conditions may identify, for example, a minimum, average or median quantity of reads to be aligned across one or more specific parts of a reference data set.

During alignment of set of reads 805, a client data set generator 812 may generate and/or update a client data set 813. For example, the client data set 813 may be generated and/or updated in response to alignment of each read, in response to alignment of at least a threshold number of reads, at defined time intervals, etc. The client data set 813 may be generated and/or updated prior to receiving and/or aligning all reads from a given processing associated with a client and/or in real-time as reads for a client are aligned. In some instances, updating of the client data set 813 is conditioned. For example, the updating may only be performed if a read overlaps with a position (or set of positions) for which a previous coverage vector, identifier consistency, identifier reliability and/or confidence is below a predefined threshold.

Figure 9:
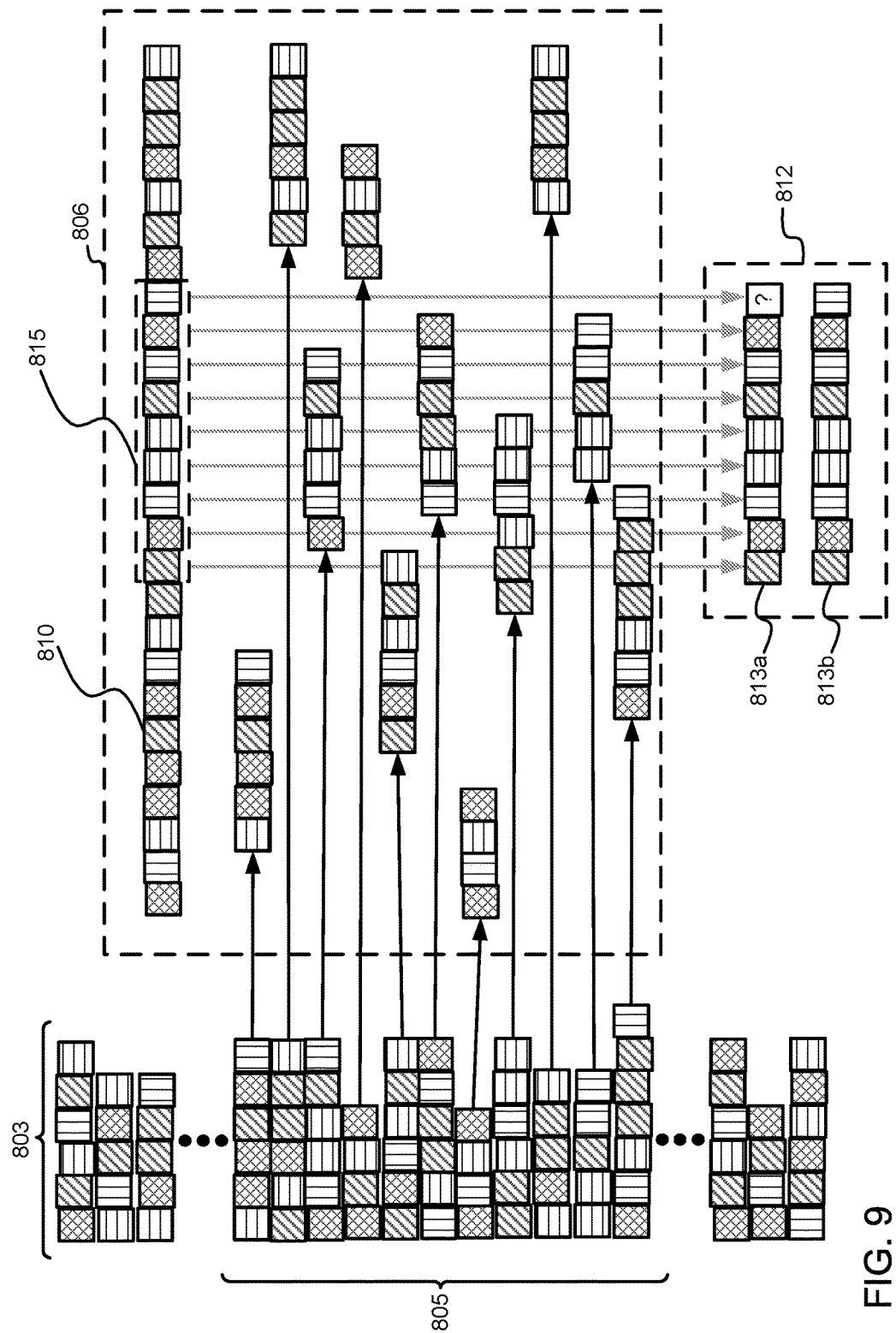
FIG. 9 shows a representation of a real-time processing of reads, in accordance with some embodiments.

Referring to FIG. 9, client data set 813 may be generated by identifying a subset of reads of set of reads 805 that include an element that is aligned to a particular position of one or more particular positions 815 of reference data set 810. For example, for set of reads 805 as shown in FIG. 9, the subset of reads that include an element that is aligned with the furthest left position of particular positions 815 includes three reads. Next, a read value for each read in the subset of reads at the particular position is identified. Again referring to the subset of reads corresponding to the furthest left position in FIG. 9, the read values for two of the three reads differs from the read value for the third read. In some instances, a value of client data set 813 at the particular position is determined to be identical to the read value for the two of the three reads in the subset. The process may then be repeated for the remaining eight positions of particular positions 815 such that nine values for client data set 813 are determined.

In some instances, none of the reads in set of reads 805 may include an element that is aligned with a particular position. For example, since there are no reads in set of reads 805 that include an element that is aligned with the furthest right position of particular positions 815, one of two approaches may be used. In a first approach, a client data set 813*a* may be generated having an empty or missing element, or client data set 813*a* may be truncated to include one less element. In a second approach, a client data set 813*b* may be generated having a furthest right element with a value equal to reference data set 810 at the particular position. In either approach, the lack of aligned reads at the particular position is reflected by one or more variables produced by variable generator 814.

Figure 10:
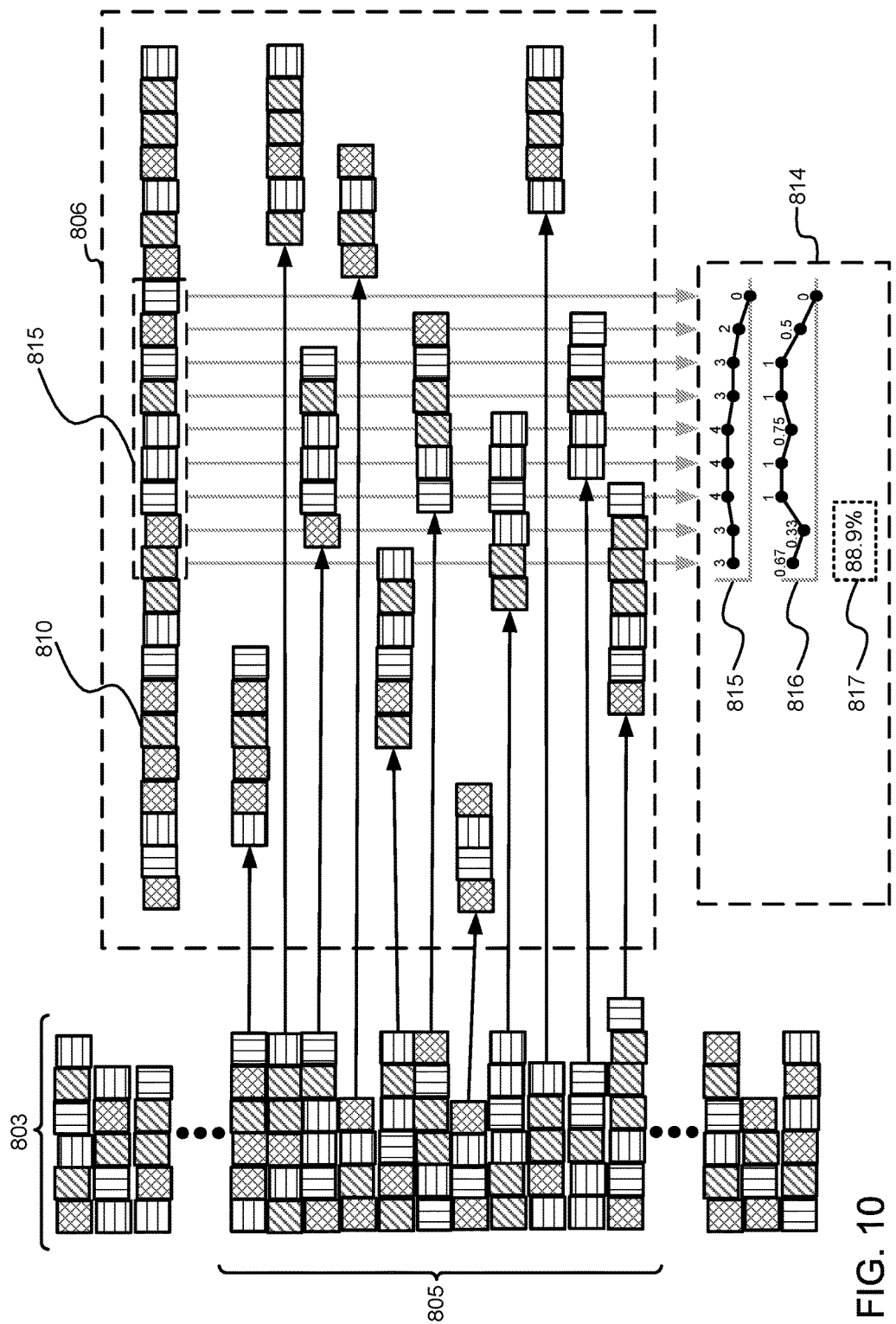
FIG. 10 shows a representation of a real-time processing of reads, in accordance with some embodiments.

Referring additionally to FIG. 10, a variable generator 814 may produce one or more variables indicative of the quality of the alignment. For example, variable generator 814 may generate a client coverage data set 815 that identifies, for each particular position of particular positions 815 and/or client data set 813 a quantity or proportion of the subset of reads that include an element that is aligned to the particular position. The client coverage data set 815 may be updated with each additional read that is processed, and may be updated simultaneously with updating client data set 813 in real-time. Variable generator 814 may also generate a client consistency data set 816 corresponding to a similarity amongst the subset of reads that include an element that is aligned to a particular position. At each position, a value for the position in the client consistency data set 816 may be equal to a percentage of the quantity of the most common read value divided by the number of reads in the subset of reads. For example, where two of three read values are the same at a particular position, client consistency data set 816 may be equal to ⅔ at the particular position. Variable generator 814 may also generate a completeness score 817 corresponding to a proportion or quantity of particular positions 815 and/or client data set 813 for which at least one of the subset of reads includes an aligned element. In one instance, completeness score 817 may be determined by dividing the number of non-zero elements of client coverage data set 815 by the total number of elements of client coverage data set 815.

Referring again to FIG. 8, processing of set of reads 805 may trigger various downstream processes, such as sparse indicator detection, quality checks, and storage of client data set 812 in storage 824. Various downstream tasks may be triggered based on (for example) confidence of alignment, coverage, and/or computational cost of potentially repeating the task. Determinations as to whether to initiate and/or confirm downstream tasks may depend, e.g., on an assessment as to how much information each new read has provided (e.g., via an entropy calculation indicating a reduction of uncertainty of a reference data set, alignment, or sparse indicator). In some instances, initiation of downstream tasks is controlled via activation and deactivation of a switch 822. In some instances, a condition evaluator 820 determines whether at least one condition is satisfied and in response causes activation or deactivation of switch 822. For example, condition evaluator 820 may cause switch 822 to activate upon determining any one or more of the following:

An average (or minimum or median) of client coverage data set 815 (generally or across one or more predefined regions) exceeds a predefined threshold;

At least a predefined percentage of the data values of client coverage data set 815 exceed a predefined threshold;

An average (or minimum or median) of client consistency data set 816 (generally or across one or more predefined regions) exceeds a predefined threshold;

At least a predefined percentage or predefined quantity of data values of client consistency data set 816 (generally or across one or more predefined regions) exceed a predefined threshold;

Completeness score 817 exceeds a predefined threshold; and

A total number of reads (or percentage of expected reads) received by assessment system 105 exceeds a predefined threshold;

Condition evaluator 820 may also send a communication 824 to a data source when a condition is satisfied. For example, upon determining that any of the above-mentioned conditions are satisfied, communication 824 can be sent to the data source indicating that processing and/or transmissions from the data source can be terminated and/or paused. The communication may include an identifier of a client or sample. Alternatively, when there is an indication (e.g., via one or more alignment quality variables) that one or more alignment results is of poor quality, e.g., when one or more variables are below a threshold, communication 824 can be sent to the data source indicating poor alignment and identifying the client associated with the data.

Upon activation of switch 822, client data set 813 can be processed by a sparse indicator detector 826 which may identify any specific differences between client data set 813 and reference data set 810. This includes comparing values of client data set 813 to corresponding values of reference data set 810 and identifying one or more sparse indicators based on the comparison. A result of sparse indicator detection may indicate a discrepancy (e.g., by identifying one or more identifier(s) and one or more position(s) of client data set 813 associated with the sparse indicator and/or indicating a type of sparse indicator. A result of the sparse indicator detection may be identified at, transmitted to and/or stored in the cloud (e.g., stored in sparse indicator data store 828 in the cloud).

In some instances, multiple client data sets are obtained for a particular client and a compiled data set may be assembled from alignments of a plurality of the client data sets. The compiled data set may be compared with one or more reference data sets or a compiled reference data set to identify sparse indicators associated with the compiled data set for the particular client. It will also be appreciated that sparse indicator detector 826 may receive client identifier data and coverage data that may be used to determine a type, identity, value, and/or confidence metric associated with a sparse indicator.

Different types of sparse indicators may be identified, such as a one-element sparse indicator representing a single data element different from reference data set 810, or a clustered sparse indicator representing a set of consecutive data elements different from reference data set 810. A clustered sparse indicator may be detected upon determining (for example) that a series of elements in a data set generally differ from those in a reference data set or that values in a client coverage data set change across the set so as to indicate that a portion of the reference data set is over- or underrepresented in the data set.

Figure 11:
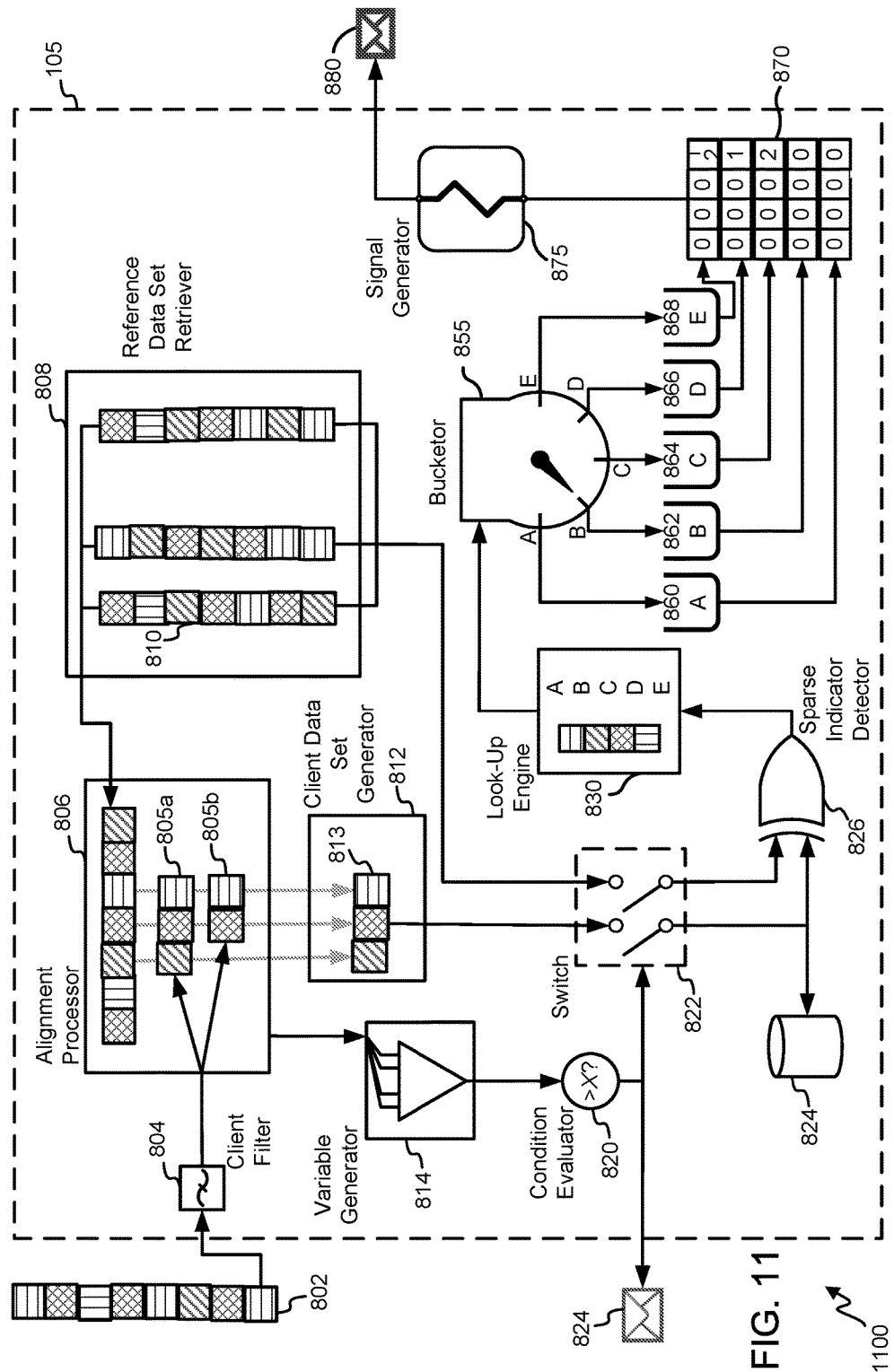
FIG. 11 shows a representation of a real-time processing of reads, in accordance with some embodiments.

Referring next to FIG. 11, a representation of real-time processing 1100 of reads and assigning sparse indicators to data buckets is shown. Initial stages of processing 1100 may parallel initial stages of process 800. In some instances, assessment system 105 may further include a look-up engine 830, which may determine whether each individual sparse indicator corresponds to bucket-assignment data in a look-up table. For example, a look-up table may include a set of entries, each of which corresponds to a sparse indicator. A sparse indicator may be identified (for example) by a position and identifier or by a range of positions and type of sparse identifier (e.g., type of structural sparse identifier and/or one or more corresponding position ranges in reference data set 810). Elements that correspond to those in a reference data set need not have a value. Each of one or more other elements may include bucket-assignment data, which may identify a bucket to which the sparse indicator is to be assigned and, in some instances, a confidence of such assignment. In some instances, one or more elements indicate that bucket-assignment data is not yet available). If a look-up of a particular sparse indicator is successful, look-up engine 830 may proceed to assign the sparse indicator in accordance with the bucket-assignment data.

Look-up engine 830 may further allow for filtering of sparse indicators, such as to determine when a reviewer-assisted analysis of a particular sparse indicator is not needed or not to be performed. For example, some sparse indicators may be pre-assigned to particular data bucket(s) and look-up engine may identify these sparse indicators as such. In another example, some sparse indicators may not be suitable for an iterative analysis and/or may predetermined such that no resources are to be used in analyzing the sparse indicator. For example, some sparse indicators are associated with a position in a full data set for which analysis is determined to be unnecessary. Optionally, some sparse indicators are associated with a position in a full data set and value for which analysis is determined to be unnecessary.

Assessment system 105 may further include bucketor 855, which may assign each sparse indicator to a bucket of a plurality of data buckets, such as by using stage result(s) from data processor 840 and/or look-up result(s) from look-up engine 830. Bucketor 855 may then assign a particular data bucket for the particular sparse indicator being analyzed. It will be appreciated that more bucketors 855 may be included. In assessment system 105, five data buckets 860, 862, 864, 866, and 868 are depicted, though it will be appreciated that more or fewer data buckets may be utilized. Some or all of data buckets 860-868 may, for example, span a range along a spectrum of a degree of likeliness that a client will transition into or experience a particular state. Upon full or partial completion of the assignment of the sparse indicators to data buckets, information may be passed to bucket assessor 870. It will be appreciated that counts assigned to a set of buckets may be determined with respect to each of multiple position ranges (or units) or combinations thereof. For example, for a given data set, a count may be generated for each of a set of buckets and for each of a set of units that reflects a number of sparse indicators detected for the unit that correspond to the bucket.

Assessment system 105 may further include bucket assessor 870. Although bucket assessor 870 is shown schematically as a separate component from bucketor 855, it will be appreciated that bucket assessor 870 and bucketor 855 may be combined in a single component or process. Bucket assessor 870 may identify a number of sparse indicators assigned to particular buckets 860-868 using one or more counters, for example. Bucket assessor 870 may optionally determine whether one or more buckets include counts above a predetermined threshold (e.g., whether a count exceeds zero). The predetermined threshold may be (for example) defined by a user, generated based on machine learning, generated based on a virtual structural representor, and/or generated based on a population analysis. For example, in one instance, it may be determined whether a count in a given bucket or a total count across a combination of buckets (e.g., a bucket corresponding to a highest predicted likelihood, amongst the buckets, of transitioning into or being in a particular state or two buckets corresponding to the two highest predicted likelihoods) exceeds zero. It will be appreciated that predetermined thresholds for each data bucket may be independent of other predetermined thresholds. Bucket assessor 870 may forward the counts corresponding to the buckets 860-868 to signal generator 875.

A signal generator may use the counts and/or results of a threshold comparison, for example, to generate a communication 880 indicative of whether a number of sparse indicators assigned to particular data buckets exceed the predetermined threshold(s). In some embodiments, different templates for communication 880 may be used depending on which data bucket(s) exceed the predetermined threshold(s) and or by how much a threshold(s) is exceeded, for example. Communication 880 may identify, for example, whether one or more sparse indicators are assigned to a bucket representing a highest probability, amongst the buckets, of transitioning into or being at a particular state. Communication 880 may identify, for example, whether one or more sparse indicators are assigned to each of one or more other buckets.

Figure 12:
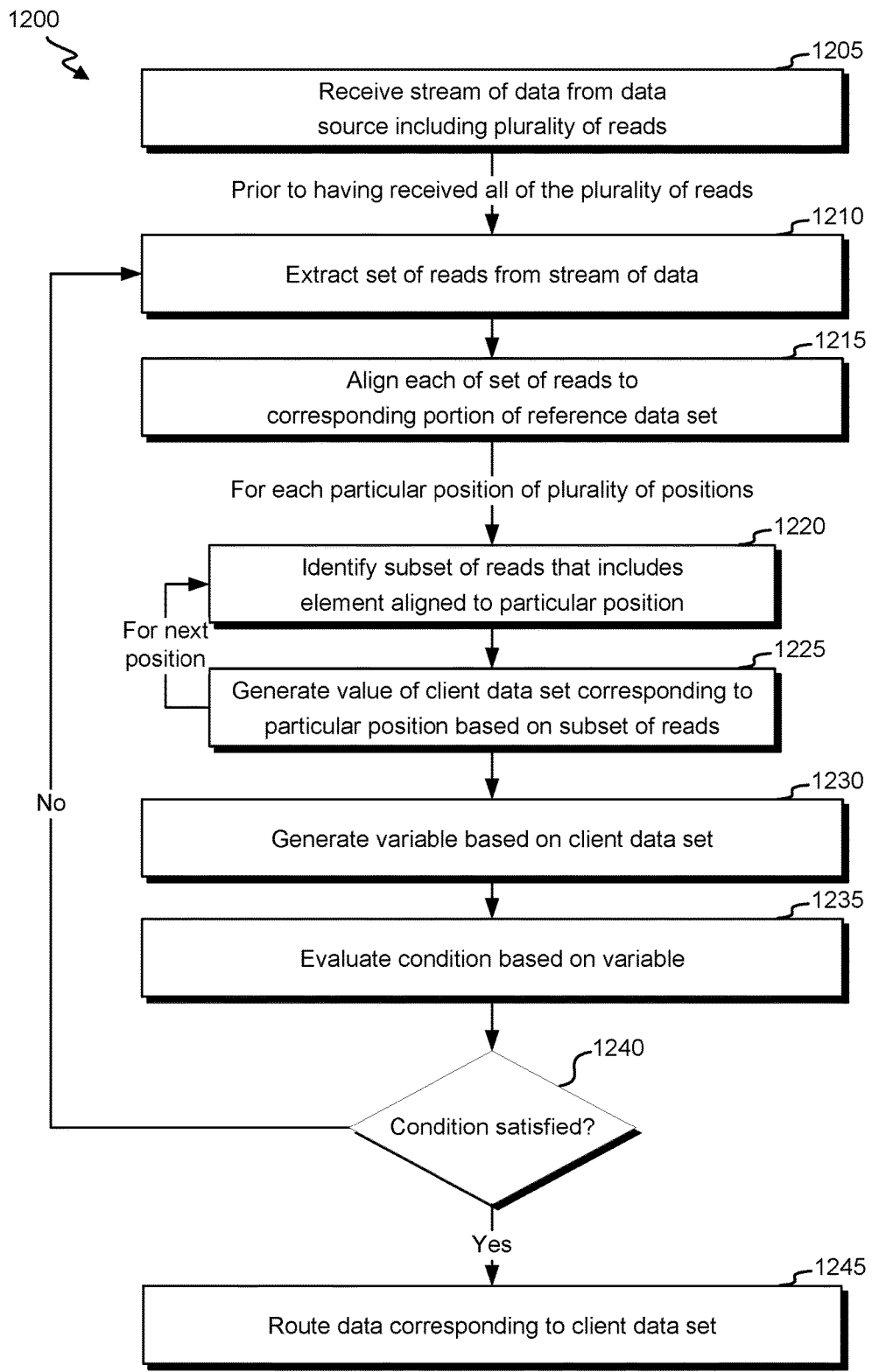
FIG. 12 illustrates a process for processing and aligning a set of reads, in accordance with some embodiments.

FIG. 12 illustrates a process 1200 for processing and aligning a set of reads according to some embodiments of the present disclosure. Process 1200 may be performed, for example, in part or in its entirety by an assessment system, such as assessment system 105. Process 1200 begins at block 1205 where a stream of data including a plurality of reads is received from a data source. In some instances, each of the plurality of reads corresponds to a client. The stream of data can include, for example, a continuous stream of data and/or multiple discrete communications. All or part of the stream of data may be received by (for example) actively retrieving (e.g., pulling) reads from the data source or by passively receiving (e.g., being pushed) the reads from the data source (e.g., when the reads are generated). For example, assessment system 105 may transmit one or more requests to a data generation system for reads (e.g., at one or more defined times or upon detecting an availability of one or more processing resources or upon detecting that a threshold time associated with a particular client has passed). In pushed instances, reads may be received (for example) immediately after they are generated or after some further processing has occurred (e.g., an initial quality check). In pulled instances, reads may be requested (for example) after detecting a particular type of resource availability, time passage (e.g., since initiation of a previous stage of processing a client-associated request), etc. The request(s) may identify one or more particular clients or may more generally request any (e.g., and all) new reads.

Prior to having received all of the plurality of reads (e.g., and while the stream is still being received, such as while a continuous stream is still being received or in the midst of receiving multiple discrete communications), the remaining blocks of process 1200 are performed. For example, blocks 1210-1245 may be performed after each read of the plurality of reads is received.

At block 1210, each read of a set of reads is extracted from the stream of data. The set of reads may be multiple reads but an incomplete part of the plurality of reads. In various instances, the assessment system may, but need not, have information that indicates that not all of the plurality of reads corresponding to a given client. For example, a protocol may exist that indicates that a data source is to send completion indication (e.g., that includes an identifier of a client) to the assessment system when all of the plurality of reads have been transmitted, such that lack of receipt of such indication indicates that not all of a client's reads have been received. As another example, the stream of data may identify an estimated completion percentage that identifies a percentage of processing of a client sample that is complete, such that it can be estimated that processing is incomplete when the percentage is less than 100% or less than about 100%. As yet another example, assessment system may estimate that more of the plurality of reads remain to be received so long as (for example) a continuous data stream including reads for the client is continuing to be received and/or a time between consecutive discrete communications (each including one or more reads for the client) has not exceeded a predefined threshold.

The set of reads may be extracted from the data stream by, for example, using a schema to identify one or more parts of the data stream, each of which includes a read. For example, a schema may identify one or more particular delimiters or field name prior to and/or after a read, such that data between such defined components can be extracted and identified as a read. An extraction approach may include detecting each part of the data stream that includes (e.g., only) a consecutive listing of any of a set of (e.g., four) defined identifiers. An extraction may correspond to identifying a set of identifier values corresponding to an array index or array row/column.

In some instances, additional data is extracted in conjunction with extracting each read (or a group of reads). For example, a client identifier, data-quality metric, read length and/or read count may be extracted. To illustrate, a discrete communication in the stream of data may include header information that identifies a particular client, a number of reads included in the communication and (optionally) a length of each of the number of reads. Each of the number of reads can be extracted (e.g., and an extraction may be facilitated by the length information) and associated with the client. In some instances, the stream of data includes, for each client of multiple clients, a set of reads. In such circumstances, the stream may include data associating each read (or group of reads) with a client identifier. Block 1210 may then include extracting each of the reads from the part of the stream that has been received as well as corresponding client identifiers, associating each read with a client identifier, at least temporarily storing the reads in association with respective client identifiers, and then accessing reads associated with a particular client identifier.

At block 1215, each of the set of reads is aligned to a corresponding portion of a reference data set. As described herein, the set of reads may be aligned by comparing each individual read of the set of reads with each of multiple portions of the reference data set. A score may be generated based on each alignment, such as a score representing a degree of match and/or correspondence between potentially aligned identifiers (e.g., including or based on a fraction of the identifiers in the read that match (e.g., and/or are complementary to) identifiers in the reference data). A particular alignment for a read may be identified as corresponding to a portion of the multiple portions that is associated with a highest and/or above-threshold score. An alignment result can characterize the particular alignment by identifying (for example) a start and/or stop position of the reference-data set, where the portion extends from the start position to the stop position. In some instances, only one of the start and/or stop positions are identified, as the other position may be inferred based on a length of a read. The alignment result may include a range from the start position to the stop position. The alignment result may include a score associated with the alignment. The alignment result may (further or alternatively) include one or more units associated with the portion and/or a start and/or a stop position of the portion relative to the unit.

In some embodiments, process 1200 may immediately proceed with performance of block 1220 after block 1215 is performed. In other embodiments, a downstream processing condition is first evaluated to determine whether to proceed to block 1220. Upon the downstream processing condition being satisfied, process 1200 then proceeds with block 1220 and possibly other downstream processes. The downstream processing condition may be configured to be satisfied when a number of reads received from a client exceeds a predetermined threshold, when a number of reads that are aligned at least partly or by at least a defined amount with one or more particular units exceeds a threshold, when a minimum/average/median number of reads aligned to each of one or more defined portions (e.g., each position within one or more units) exceeds a predefined threshold, when a minimum/average/median number of reads with a consistent identifier that is aligned to each of one or more defined portions (e.g., each position within one or more units) exceeds a predefined threshold, when an average/median read-data identifier consistency across one or more defined positions (e.g., each position within one or more units) exceeds a predefined threshold. In some instances, the downstream processing condition may be based on one or more variables generated by variable generator 814. Thus, in some instances, block 1230 may be performed prior to evaluating the downstream processing condition, i.e., performed prior, concurrently, or immediately after block 1215 in order to provide variables for the downstream processing condition.

For each particular position of a plurality of particular positions of the reference data set, blocks 1220 and 1225 are performed. The plurality of positions can be predefined. The plurality of positions can include (for example) positions potentially affecting a state-transition assessment and/or being within one or more pre-identified units of the reference data set.

At block 1220, a subset of reads of the aligned set of reads are identified. The subset may be identified by identifying each read in the set of reads that includes an identifier (e.g., any identifier) that is aligned to the particular position of the reference data set and assigning each such read to the subset. In some instances, the order in which the particular positions are iterated through may be left-to-right, right-to-left, top-to-bottom, bottom-to-stop, start-to-end, in increasing or decreasing order of size (as determined by the client coverage data set), in increasing or decreasing order of consistency (as determined by the client consistency data set), among other possibilities.

At block 1225, a value of a client data set is generated for the particular position based on the subset of reads. In some instances, an aggregated group of identifiers can be generated based on the subset so as to be defined as the identifiers within the subset that are aligned to the particular position.

In some instances, the value of the client data set may be set to be one identifier (e.g., or a predefined number of identifiers) of the aggregated group of identifiers. The value of the client data set may be generated based on assessing a distribution of the aggregated group of identifiers. For example, the value (e.g., identifier) of the client data set for the particular position may be defined to be a mode amongst or a most common identifier across the aggregated group of identifiers. In some instances, each identifier in the aggregated group of identifiers is assigned a weight, and the value of the client data set further depends on the weights (e.g., by generating a sum of all weights and setting the value to the identifier with the highest sum). A weight may correspond to (for example) a length (e.g., number of identifiers/elements) of the read to which the identified read value belongs (e.g., such that identified read values belonging to longer reads are given greater weight than identified read values belonging to shorter reads), a quality metric assigned to a read (e.g., with higher weights corresponding to higher quality metrics), and/or an alignment confidence metric (e.g., with higher weights corresponding to higher alignment confidence metrics).

In some instances, the value of the client data set may be defined to be (or to be based on) a quantity of identifiers of the aggregated group of identifiers (e.g., including or corresponding to a coverage value). In some instances, the value of the client data set may be defined to be or to be based on a maximum number of the identifiers within the aggregated group that are a same identifier. In some instances, the value of the client data set may be defined based on a distribution of identifiers within the aggregated group of identifiers (e.g., including or representing a consistency value), such as being or being based on a maximum percentage of the identifiers within the aggregated group that are a same identifier.

Process 1200 can return to block 1220 to repeat blocks 1220 and 1225 for any other particular position in the plurality of positions for which blocks 1220 and 1225 have not yet been performed. Upon performing blocks 1220 and 1225 for each position of the plurality of positions, process 1200 proceeds to block 1230.

At block 1230, at least one variable is generated based on the client data set. The at least one variable may include (for example) generating a statistic based on the values for the client data set. For example, the variable may be defined to be an average, median, mode, standard deviation, variance, or percentage (e.g., percentage of positions with a value above a predefined value threshold) of the values (e.g., across the plurality of positions).

At block 1235, at least one condition is evaluated based on the at least one variable. The condition may be configured to be satisfied when (for example) a variable of the at least one variable exceeds a predefined threshold or when each variable of the at least one variable exceeds (or is below) a corresponding predefined threshold. Thus, for example, configurations for a definition of a variable of the at least one variable and the condition may correspond to an indication that the condition is to be satisfied when—while considering positions throughout the plurality of positions—a sufficient quantity of reads have been received, a sufficient reliability of identifiers across aligned reads is detected, or a quality metric (e.g., generated based on a distribution of aligned identifiers at each position) is below a threshold. In some instances, the condition and/or variable are configured to correspond to all of the plurality of positions and/or to a client-level analysis. In some instances, the condition and/or variable are configured to apply more specifically. For example, a variable may be generated for each of multiple units (e.g., each corresponding to multiple positions) within the plurality of positions, and the condition may be evaluated for each unit. At block 1240, it is determined whether the at least one condition is satisfied. If it is determined that the at least one condition is not satisfied, then process 1200 returns to block 1210.

If it is determined that the at least one condition is satisfied, then block 1245 is performed in which data that corresponds to the client data set is routed. The data that is routed at block 1245 includes one or more of: a client identifier, one or more of set of reads 805, part or all of the values identified for the client data set, and/or an identification of one or more of the plurality of positions (e.g., associated with one or more client data set values below a predefined value threshold, such as a consistency threshold, quality threshold or aligned-read-count threshold; or associated with one or more client data set values above a predefined value threshold). The data may include a request or an instruction (e.g., to further process or reprocess a client sample or to perform downstream processing on the client data set). For example, upon detecting that a condition is satisfied that reflects low data quality, a communication may be sent to a data generation system (e.g., data source) that requests that a client sample be reprocessed using a different processing type to generate a new plurality of reads.

As another example, upon detecting that a condition is satisfied that indicates that—with respect to one or more particular units—an identifier confidence is sufficiently high, data the part or all of the client data set (e.g., a part corresponding to the one or more particular units) may be routed to one or more processors for downstream processing of a workflow. The downstream processing may include (for example) comparing the client data set to a reference data set to detect any sparse indicators (representing differences between the data set), assigning each detected sparse indicator to a bucket and/or generating a state-transition variable based on the bucket assignments (which then may be presented or transmitted to a client device or other device). It will be appreciated that, in some instances, a client data set routed at block 1245 may, but need not, be different than one used for to generate the variable at block 1230. For example, values of the client data set generated at block 1225 may include quantities of reads aligned to various positions, while a routed client data set may alternatively or additionally include identifiers associated with each of various positions.

It will be appreciated that process 1200 can repeatedly return to block 1205. For example, in some instances, new data corresponding to a client may be continuing to be received while one or more of blocks 1210-1245 are being performed. Such new data may trigger new iterations to (e.g., concurrently) be performed, or the data may be stored until a next iteration of the process is triggered (e.g., via resource availability or passage of a predefined time interval from a completion of a previous iteration corresponding to a client). In various circumstances, new data may, but need not, be processed differently. For example, if downstream processing is triggered for at least part of a client data set, new reads may be aligned and used to determine whether the reads result in a change to the client data set. If so, corresponding data may be routed for downstream processing. However, if not, such downstream processing need not be triggered (e.g., despite potentially higher data-quality and/or coverage values), given that downstream processing using a same client data set may have already occurred.

Techniques described herein can provide various advantages. For example, initiating alignment and/or downstream processing prior to receiving a full read set for a client can facilitate generation and/or transmission of results more quickly. Further, this processing can facilitate early detection of data potentially indicative of a data-quality problem. A communication can then be transmitted to the data source to facilitate investigation into the processing underlying the data, which may result in a quicker detection and resolution of such processing.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
receiving, at a system, a stream of data from a data source, the stream of data including a plurality of reads, wherein each of the plurality of reads corresponds to a client;
while receiving the stream of data and prior to having received all of the plurality of reads:
extracting each of a set of reads from the stream of data;
aligning each of the set of reads to a corresponding portion of a reference data set;
for each particular position of a plurality of particular positions of the reference data set:
identifying a subset of reads of the aligned set of reads, each read in the subset of reads including an identifier that is aligned to the particular position of the reference data set; and
generating a value of a client data set based on the subset of reads, the value corresponding to the particular position, wherein generating the value of the client data set includes generating a value of a client coverage data set corresponding to a proportion and/or quantity of the subset of reads that include an identifier that is aligned to the particular position of the reference data set;
generating at least one variable based on the values of the client data set;
determining, based on the at least one variable, that at least one condition is satisfied; and
in response to determining that the at least one condition is satisfied, routing data that corresponds to the client data set, wherein routing data that corresponds to the client data set includes availing at least part of the client data set to one or more processors for sparse indicator detection.

2. The method of claim 1, wherein:
each of the plurality of reads includes a sequence read that identifies an ordered set of bases;
the reference data set includes a reference sequence that identifies a reference ordered set of bases;
the client data set includes a client sequence; and
the sparse indicator detection includes variant detection.

3. The method of claim 2, wherein generating the value of the client data set based on the subset of reads further includes:
identifying, for each read in the subset of reads, a read value for the particular position; and
determining the value of the client data set based on the identified read values, wherein the read value for each of at least some of the subset of reads is the same as the value for the client data set.

4. The method of claim 2, wherein generating the value of the client data set includes:
generating a value of client consistency data set corresponding to a similarity amongst the subset of reads that include the identifier that is aligned to the particular position of the reference data set.

5. The method of claim 2, further comprising:
in response to determining that the at least one condition is satisfied:
comparing values of the at least part of the client data set to corresponding values of the reference data set;
identifying one or more sparse indicators based on the comparison;
for each sparse indicator of the one or more sparse indicators, assigning the sparse indicator to a data bucket of a plurality of data buckets;
for each data bucket of one or more of the plurality of data buckets, assessing a number of sparse indicators assigned to the data bucket;
generating a client result based on the assessment; and
transmitting or presenting the client result prior to the having received all of the plurality of reads.

6. The method of claim 2, wherein:
the at least one variable includes a quality metric that corresponds to a quality of the set of reads;
determining that the at least one condition is satisfied includes determining that the quality metric is below a predefined threshold; and
routing data that corresponds to the client data set includes transmitting a data-quality communication to the data source that includes an identifier associated with the client and is reflective of the quality metric.

7. The method of claim 2, wherein receiving the stream of data includes receiving a series of discrete communications from the data source, each communication of the series of discrete communications including at least one read of the plurality of reads.

8. A system, comprising:
one or more data processors; and
a non-transitory computer readable storage medium containing instructions which when executed on the one or more data processors, cause the one or more data processors to perform actions including:
receiving a stream of data from a data source, the stream of data including a plurality of reads, wherein each of the plurality of reads corresponds to a client;
while receiving the stream of data and prior to having received all of the plurality of reads:

extracting each of a set of reads from the stream of data;
aligning each of the set of reads to a corresponding portion of a reference data set;
for each particular position of a plurality of particular positions of the reference data set:
identifying a subset of reads of the aligned set of reads, each read in the subset of reads including an identifier that is aligned to the particular position of the reference data set; and
generating a value of a client data set based on the subset of reads, the value corresponding to the particular position, wherein generating the value of the client data set includes generating a value of a client coverage data set corresponding to a proportion and/or quantity of the subset of reads that include an identifier that is aligned to the particular position of the reference data set;
generating at least one variable based on the values of the client data set;
determining, based on the at least one variable, that at least one condition is satisfied; and
in response to determining that the at least one condition is satisfied, routing data that corresponds to the client data set, wherein routing data that corresponds to the client data set includes availing at least part of the client data set to one or more processors for sparse indicator detection.

9. The system of claim 8, wherein:
each of the plurality of reads includes a sequence read that identifies an ordered set of bases;
the reference data set includes a reference sequence that identifies a reference ordered set of bases;
the client data set includes a client sequence; and
the sparse indicator detection includes variant detection.

10. The system of claim 9, wherein generating the value of the client data set based on the subset of reads further includes:
identifying, for each read in the subset of reads, a read value for the particular position; and
determining the value of the client data set based on the identified read values, wherein the read value for each of at least some of the subset of reads is the same as the value for the client data set.

11. The system of claim 9, wherein generating the value of the client data set includes:
generating a value of client consistency data set corresponding to a similarity amongst the subset of reads that include the identifier that is aligned to the particular position of the reference data set.

12. The system of claim 9, wherein the actions further include:
in response to determining that the at least one condition is satisfied:
comparing values of the at least part of the client data set to corresponding values of the reference data set;
identifying one or more sparse indicators based on the comparison;
for each sparse indicator of the one or more sparse indicators, assigning the sparse indicator to a data bucket of a plurality of data buckets;
for each data bucket of one or more of the plurality of data buckets, assessing a number of sparse indicators assigned to the data bucket;
generating a client result based on the assessment; and
transmitting or presenting the client result prior to the having received all of the plurality of reads.

13. The system of claim 9, wherein:
the at least one variable includes a quality metric that corresponds to a quality of the set of reads;
determining that the at least one condition is satisfied includes determining that the quality metric is below a predefined threshold; and
routing data that corresponds to the client data set includes transmitting a data-quality communication to the data source that includes an identifier associated with the client and is reflective of the quality metric.

14. The system of claim 9, wherein receiving the stream of data includes receiving a series of discrete communications from the data source, each communication of the series of discrete communications including at least one read of the plurality of reads.

15. A computer-program product tangibly embodied in a non-transitory machine-readable storage medium, including instructions configured to cause one or more data processors to perform actions including:
receiving a stream of data from a data source, the stream of data including a plurality of reads, wherein each of the plurality of reads corresponds to a client;
while receiving the stream of data and prior to having received all of the plurality of reads:
extracting each of a set of reads from the stream of data;
aligning each of the set of reads to a corresponding portion of a reference data set;
for each particular position of a plurality of particular positions of the reference data set:
identifying a subset of reads of the aligned set of reads, each read in the subset of reads including an identifier that is aligned to the particular position of the reference data set; and
generating a value of a client data set based on the subset of reads, the value corresponding to the particular position, wherein generating the value of the client data set includes generating a value of a client coverage data set corresponding to a proportion and/or quantity of the subset of reads that include an identifier that is aligned to the particular position of the reference data set;
generating at least one variable based on the values of the client data set;
determining, based on the at least one variable, that at least one condition is satisfied; and
in response to determining that the at least one condition is satisfied, routing data that corresponds to the client data set, wherein routing data that corresponds to the client data set includes availing at least part of the client data set to one or more processors for sparse indicator detection.

16. The computer-program product of claim 15, wherein:
each of the plurality of reads includes a sequence read that identifies an ordered set of bases;
the reference data set includes a reference sequence that identifies a reference ordered set of bases;
the client data set includes a client sequence; and
the sparse indicator detection includes variant detection.

17. The computer-program product of claim 16, wherein generating the value of the client data set based on the subset of reads further includes:
identifying, for each read in the subset of reads, a read value for the particular position; and
determining the value of the client data set based on the identified read values, wherein the read value for each of at least some of the subset of reads is the same as the value for the client data set.

18. The computer-program product of claim 16, wherein generating the value of the client data set includes:
generating a value of client consistency data set corresponding to a similarity amongst the subset of reads that include the identifier that is aligned to the particular position of the reference data set.

19. The computer-program product of claim 16, wherein the actions further include:
in response to determining that the at least one condition is satisfied:
comparing values of the at least part of the client data set to corresponding values of the reference data set;
identifying one or more sparse indicators based on the comparison;
for each sparse indicator of the one or more sparse indicators, assigning the sparse indicator to a data bucket of a plurality of data buckets;
for each data bucket of one or more of the plurality of data buckets, assessing a number of sparse indicators assigned to the data bucket;
generating a client result based on the assessment; and
transmitting or presenting the client result prior to the having received all of the plurality of reads.

20. The computer-program product of claim 16, wherein:
the at least one variable includes a quality metric that corresponds to a quality of the set of reads;
determining that the at least one condition is satisfied includes determining that the quality metric is below a predefined threshold; and
routing data that corresponds to the client data set includes transmitting a data-quality communication to the data source that includes an identifier associated with the client and is reflective of the quality metric.

* * * * *